United States Patent [19]
Sato

[11] Patent Number: 5,323,270
[45] Date of Patent: Jun. 21, 1994

[54] INTERNAL FOCUSING TELEPHOTO LENS

[75] Inventor: Susumu Sato, Chiba, Japan

[73] Assignee: Nikon Corporation, Tokyo, Japan

[21] Appl. No.: 110,208

[22] Filed: Aug. 23, 1993

Related U.S. Application Data

[63] Continuation of Ser. No. 818,514, Jan. 9, 1992, abandoned.

[30] Foreign Application Priority Data

Jan. 23, 1991 [JP] Japan .................................. 3-006132
Mar. 25, 1991 [JP] Japan .................................. 3-059980

[51] Int. Cl.$^5$ .............................................. G02B 13/02
[52] U.S. Cl. .................................... 359/746; 359/745; 359/747
[58] Field of Search ............... 359/745, 746, 747, 748, 359/684, 690

[56] References Cited

U.S. PATENT DOCUMENTS 4,113,357  9/1978  Nakamura ............................ 350/212
4,709,998 12/1987  Yamanashi ........................... 359/745
4,732,459  3/1988  Hayashi ................................ 359/745

Primary Examiner—William L. Sikes
Assistant Examiner—Hung Xuan Dang
Attorney, Agent, or Firm—Shapiro and Shapiro

[57] ABSTRACT

An internal focusing telephoto lens includes, in succession from the object side, a first lens unit of positive refractive power having at least a positive first lens component, a second lens unit having negative refractive power and movable along the optical axis for focusing, and a third lens unit having positive refractive power and having an imaging function. The first lens unit forms a substantially afocal system with the second lens unit, and is designed to satisfy the following conditions:

$$0.43 < \phi/f_1 < 0.75$$

$$0.39 < f_1/F < 0.55,$$

where
$\phi$: the effective diameter of the object side lens surface of the positive first lens component in the first lens unit,
$f_1$: the focal length of the first lens unit,
$F$: the focal length of the entire system.

35 Claims, 5 Drawing Sheets

INTERNAL FOCUSING TELEPHOTO LENS

This is a continuation of application Ser. No. 818,514 filed Jan. 9, 1992, now abandoned.

BACKGROUND OF THE INVENTION

1. Field of the Invention

This invention relates to a telephoto lens for a camera, and particularly to an internal focusing telephoto lens suitable for use in an auto focus camera such as a single-lens reflex camera or an electronic still camera.

2. Related Background Art

An internal focusing telephoto objective lens which comprises three positive, negative and positive lens units and in which the middle negative lens units is moved in the direction of the optical axis to accomplish focusing is known. Heretofore, however, in the internal focusing telephoto objective lens of this type, the movement distance of the focusing lens unit has been very long when focusing is effected. That is, when the focal length is lengthened to increase the photographing magnification, it has led to the tendency that the movement distance of the focusing lens unit also becomes long. This is turn has led to the disadvantage that the burden of a motor for auto focus driving becomes great and a lens moving mechanism for focusing becomes bulky.

SUMMARY OF THE INVENTION

It is an object of the present invention to overcome the disadvantage peculiar to the prior-art telephoto lens and to provide an internal focusing telephoto lens which maintains an excellent optical performance and yet is compact and small in the amount of focusing movement.

To achieve the above object, the internal focusing telephoto lens according to the present invention includes, in succession from the object side, a first lens unit having positive refractive power, a second lens unit having negative refractive power, and a third lens unit having positive refractive power, said first lens unit and said second lens unit forming a substantially afocal system, and is designed such that focusing is effected by the second lens unit. The first lens unit has, in succession from the object side, a forward unit comprising a positive first lens component, a positive second lens component and a negative third lens component and having positive refractive power as a whole, and a rearward unit having weak positive refractive power relative to the forward group, and is designed to satisfy the following conditions:

$$0.43 < \phi/f_1 < 0.75$$

$$0.39 < f_1/F < 0.55,$$

where $\phi$: the radius of curvature of the object side lens surface of that positive lens component in the first lens unit which is most adjacent to the object side, $f_1$: the focal length of the first lens unit, $F$: the focal length of the entire system.

The second lens unit has at least a negative first lens component and a negative second lens component, and is desirably designed to satisfy the following condition:

$$0.13 < f_{22}/f_{21} < 0.35,$$

where $f_{21}$ is the focal length of the negative first lens component, and $f_{22}$ is the focal length of the negative second lens component.

Further, the third lens unit has at least a positive lens component, and is desirably designed to satisfy the following condition:

$$0 < R_1 + 0.9R_2,$$

where $R_1$ is the radius of curvature of the object side lens surface of the positive lens component, and $R_2$ is the radius of curvature of the image side lens surface of the positive lens component.

By the designing as described above, there can be provided a more compact internal focusing telephoto lens.

Other objects, features and effects of the present invention will become fully apparent from the following detailed description taken in conjunction with the accompanying drawings.

DESCRIPTION OF THE PREFERRED EMBODIMENTS

Some embodiments of the present invention will hereinafter be described in detail with reference to the accompanying drawings.

Figure 6:
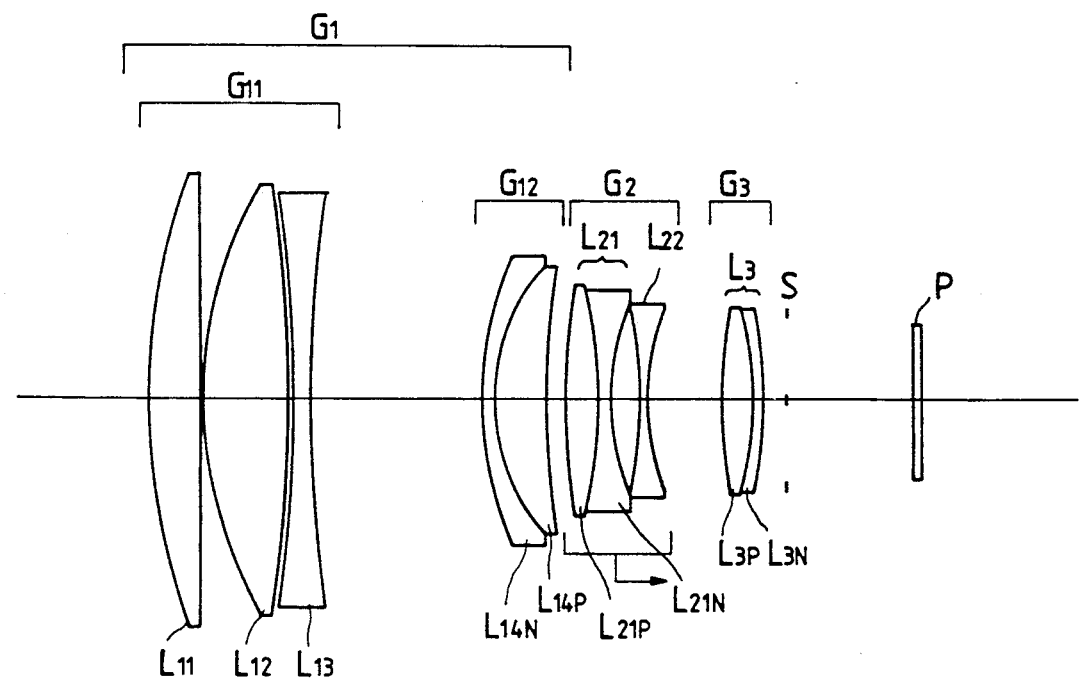
FIG. 6 is a lens construction view showing a sixth embodiment of the present invention.
Figure 7:
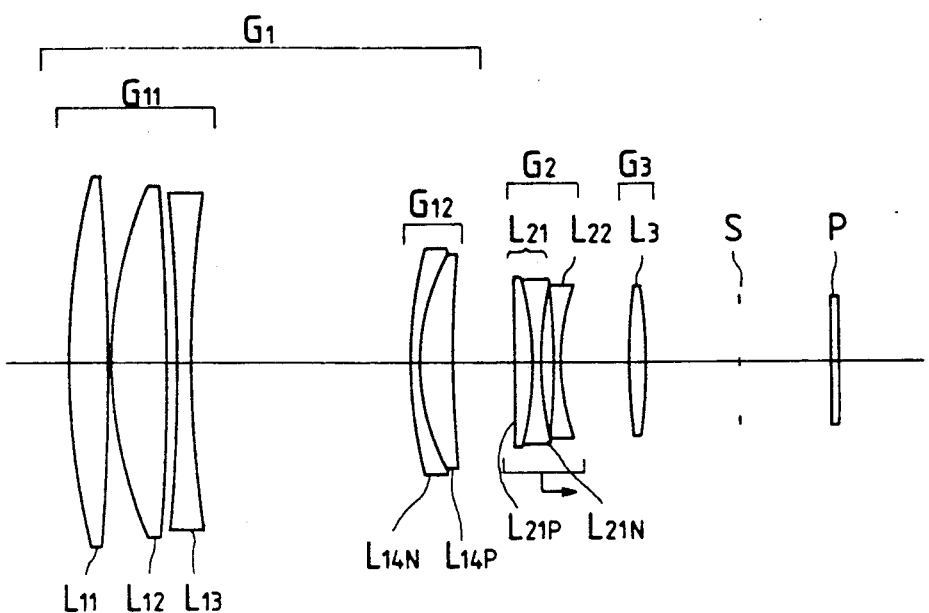
FIG. 7 is a lens construction view showing a seventh embodiment of the present invention.
Figure 8:
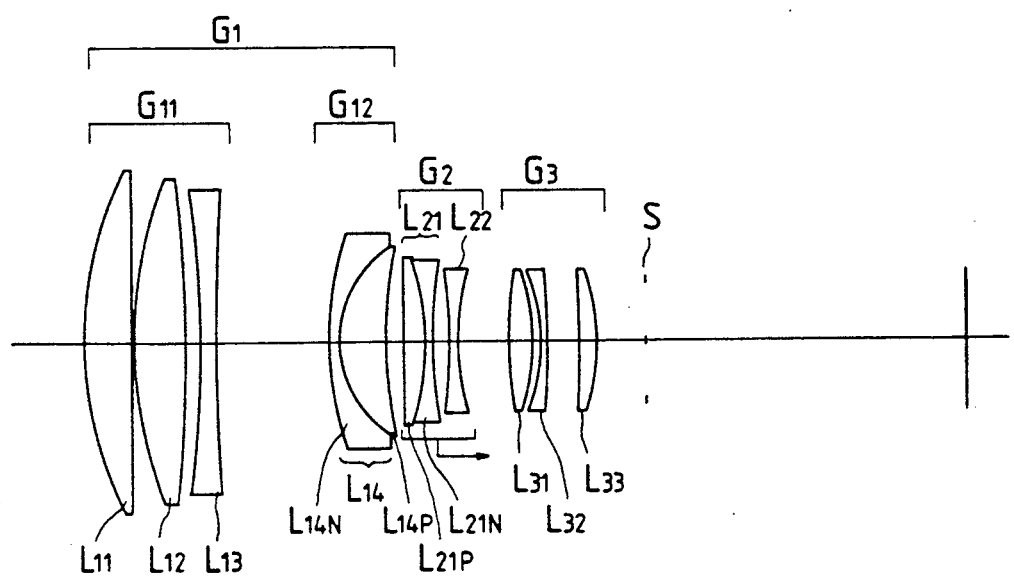
FIG. 8 is a lens construction view showing an eighth embodiment of the present invention.
Figure 9:
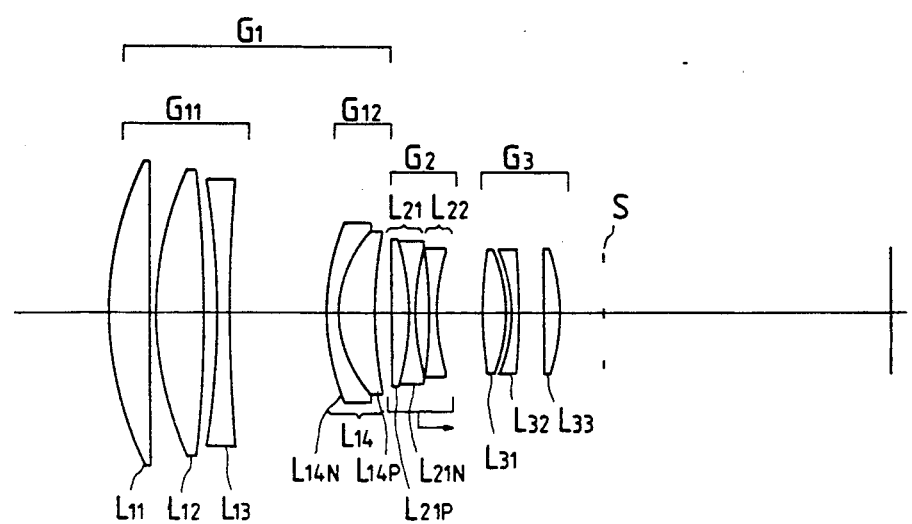
FIG. 9 is a lens construction view showing a ninth embodiment of the present invention.
Figure 10:
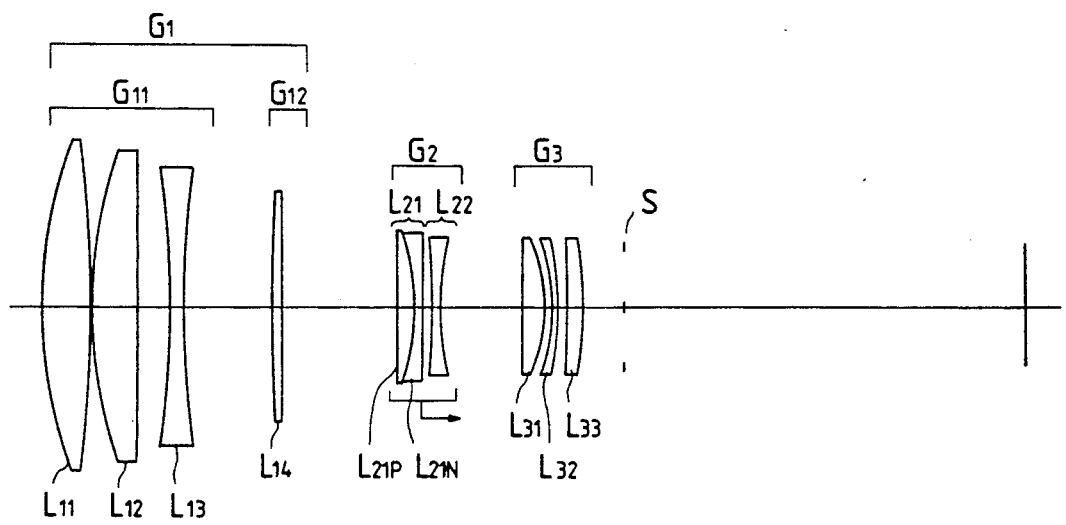
FIG. 10 is a lens construction view showing a tenth embodiment of the present invention.

FIGS. 1 to 7 are lens construction views showing first to seventh embodiments, respectively, of the present invention, and FIGS. 8 to 10 are lens construction views showing eighth to tenth embodiments, respectively, of the present invention.

The interval focusing telephoto lens according to the present invention, as shown in FIGS. 1 to 10, basically comprises, in succession from the object side, three positive, negative and positive lens units, i.e., a first lens unit G1 having positive refractive power, a second lens unit G2 having negative refractive power, and a third lens unit G3 having positive refractive power, and the focusing thereof is accomplished by the movement of the negative second lens unit G2. This focusing system is accomplished by the focus of the negative second lens G2 being made coincident with the vicinity of the image point relative to an object imaged by the positive first lens unit G1. Thereby, the combined optical system of the first lens unit G1 and the second lens unit G2 becomes an afocal optical system, and the image point by this combined optical system is formed substantially at the infinity distance. Accordingly, a light ray entering the third lens unit G3 always becomes a substantially afocal light ray, and the image point of the entire optical system formed through the third lens unit G3 is always a predetermined position irrespective of the object distance. By considering the disposition of the refractive power of a thin system from this, the amount of movement of the second lens unit G2 which is a thick system can be primarily determined.

So, for the reduction of the amount of movement of the negative second lens unit G2 for focusing which is the object of the present invention, the amount of movement of the image by the first lens unit G1 in the direction of the optical axis relative to the amount of movement of the object point can be made small.

If the focal length of the first lens unit G1 as a thin lens is $f_1 = f_1'$ and the object point distance is a and the image point distance is b, from the relational expression of the imaging of the lens, $$1/a + 1/b = 1/f_1' \rightarrow f_1' = a/(a/b + 1). \quad (A)$$

Considering now the vertical magnification $\alpha$, the vertical magnification $\alpha$ is expressed by the following expression:

$$\alpha = (-b/a)^2 = b^2/a^2 \rightarrow b = a\sqrt{\alpha} > 0. \quad (B)$$

Here, during focusing, the object point moves from a particular place and the object point distance a varies, but when the lens is in focus to a certain object point distance a, that is, when a=constant, to reduce the amount of movement of the negative second lens unit for focusing, i.e., the amount of movement of the image point by the first lens unit relative to the amount of movement of the object point, the vertical magnification o can be made small. If expression (B) is substituted for expression (A), $$f_1' = a/(1/\sqrt{\alpha} + 1). \quad (C)$$

Accordingly, when the vertical magnification $\alpha$ becomes small, the focal length $f_1'$ also becomes small. Therefore, if the focal length $f_1$ of the first lens unit G1 is made small, the amount of focusing movement can be made small.

However, if the power (refractive power) of the first lens unit G1 is too strong, the spherical aberration of the first lens unit G1 itself will become too great and the aberrations of the entire photographing optical system will be aggravated. Therefore, to make the amount of focusing movement small and correct spherical aberration well, expression (1) below regarding the optimal effective diameter of the first lens unit and expression (2) below regarding the optimal power of the first lens unit must be satisfied:

$$0.43 < \phi/f_1 < 0.75 \quad (1)$$

$$0.39 < f_1/F < 0.55, \quad (2)$$

where $\phi$: the effective diameter of the object side lens surface of that positive lens component in the first lens unit which is most adjacent to the object side.
F: the focal length of the entire system,
$f_1$: the focal length of the first lens unit.

In this case, the first lens unit G1 is comprised, in succession from the object side, of a forward unit G11 comprising a first lens component L11 having positive refractive power, a second lens component L12 having positive refractive power, and a third lens component L13 having negative refractive power and having positive refractive power as a whole, and a rearward unit G12 having weak positive refractive power relative to the forward unit G11, and the second lens unit G2 is designed to have, in succession from the object side, at least a lens component L21 having negative refractive power and a lens component L22 also having negative refractive power, and the third lens unit G3 is designed to have at least one lens component having positive refractive power.

Expression (1) is a conditional expression which prescribes the ratio of the effective diameter $\phi$ of the object side lens surface of that positive lens component in the first lens unit which is most adjacent to the object side to the focal length $f_1$ of the first lens unit. If the upper limit of expression (1) is exceeded, the focal length $f_1$ of the first lens unit G1 will become too small relative to the effective diameter and therefore, the spherical aberration of the first lens unit G1 itself will become too great and it will be difficult to construct the second lens unit G2 and the third lens unit G3 of a small number of lenses and moreover correct spherical aberration well. The spherical aberration of secondary color will also become great and it will also become difficult to construct the first lens unit G1 of a small number of lenses. If the lower limit of expression (1) is exceeded, the focal length $f_1$ of the first lens unit G1 will become long and therefore, the amount of focusing movement will become great, and this is contrary to the purpose.

Expression (2) is a conditional expression regarding the ratio of the focal length $f_1$ of the first lens unit to the focal length F of the entire system. If the upper limit of expression (2) is exceeded, the focal length $f_1$ of the first lens unit will become long and therefore, the full length of the optical system will become great and the amount of focusing movement will become great, and this is not preferable. If the lower limit of expression (2) is exceeded, the focal length $f_1$ of the first lens unit G1 will become too short and therefore, an attempt to realize a great relative aperture with the first lens unit G1 remaining small in the number of lens components will lead to the necessity of making the center thickness of the positive lens great, which is turn will lead to a greater weight of the photo-taking optical system, and this is not preferable.

In the basic construction of the present invention as described above, the first lens unit G1 is very short in its focal length $f_1$ and therefore has the tendency that the spherical aberration thereof becomes great. So, it is desirable that the first lens unit G1 be of a construction in which a forward unit G11 comprising, in succession from the object side, a first lens component L1 of positive refractive power having its convex surface facing the object side, a biconvex positive second lens component L2 and a biconcave negative third lens component L3 and having positive refractive power as a whole, and a rearward unit G12 of positive refractive power are disposed.

Now, the light flux from the on-axis infinity object point which enters parallel to the optical axis and passes through the marginal edge of the lens is called Rand ray. The Rand ray entering the first lens of the telephoto lens which is most adjacent to the object side, though it is a ray emitted from the short distance object point, enters the first incidence surface substantially in parallelism to the optical axis. Therefore, the positive first lens component L11 having its convex surface facing the object side in the first lens unit G1, if considered to be an aggregate of minute prisms, need be approximate to the shape of a minimum deflection angle and therefore, the object side surface thereof is made into a convex surface and the image side surface thereof is made to have a loose curvature. The sign of the radius of curvature of the image side surface may be positive or negative depending on the aberration structure in the first lens unit G1. Since the Rand ray is made into a convergent light flux by the positive first lens component L11, the positive second lens component L12 is also made into a biconvex positive lens having its surface of sharper curvature facing the object side so as to assume a minimum deflection angle so that said light flux may be more converged, and the positive refractive power in the first lens unit G1 is substantially determined by the positive first lens component L11 and the positive second lens component L12. However, spherical aberration and chromatic aberration become too great for the presence of only the two positive lens components L11 and L12 and therefore, a negative third lens component L13 is disposed immediately behind the positive second lens component L12 to thereby effect appropriate correction. Under a condition in the vicinity of the upper limit of expression (1), the refractive power of the first lens unit G1 is very strong and therefore, the rearward unit G12 having a positive fourth lens component L14 is disposed immediately behind the forward unit G11 to distribute the positive refractive powers of the first and second lens components L11 and L12.

Referring to the rearward unit G12 in the first lens unit G1, it is preferable that in order to obtain better aberrations, the positive lens component L14 in the rearward unit G12 be comprised, in succession from the object side, of a negative meniscus lens L14N having its convex surface facing the object side and a positive meniscus lens L14P having its convex surface facing the object side. The rearward unit G12, which is for the correction of spherical aberration, is preferably be of a meniscus shape having its convex surface facing the object side so as not to affect the other rays than the Rand ray.

The negative meniscus lens L14N and the positive meniscus lens L14P in the rearward unit G12 should preferably be separated from each other from the viewpoint of securing the degree of freedom in aberration correction, but should desirably be joined together from the viewpoint of simplifying the lens barrel structure and achieving a reduction in cost.

Also, to decrease the number of components of the positive lens component L14 in the rearward unit G12 of the first lens unit G1 and simplify the lens barrel structure to thereby achieve a reduction in cost, it is possible to construct this lens component of a positive lens having weak refractive power.

Further, in the present invention, to correct aberrations better, it is more desirable that the following conditions be satisfied:

$$na < 1.60 \quad (3)$$

$$65 < va, \quad (4)$$

where $na$ is the refractive index of the positive lens component L14 in the rearward unit G12 of the first lens unit G1, and $va$ is the Abbe number of said positive lens component L14.

If the upper limit of expression (3) is exceeded the value of Petzval sum will become great negatively, and this is not preferable. If the range of expression (3) is satisfied, it will be possible in principle to make the value of Petzval sum appropriate, but if the range of the existing optical material is taken into consideration, it is more preferable that the lower limit of expression (3) be 1.42.

Also, if the lower limit of expression (4) is exceeded, it will be difficult to reduce the chromatic aberration in the first lens unit G1, and this is not desirable. If the range of expression (4) is satisfied, it will become possible in principle to minimize the creation of chromatic aberration in the first lens unit G1, but if the range of the existing optical material is taken into consideration, it is more desirable that the upper limit of expression (4) be 97.

Also, it is desirable that the second lens unit G2 comprising at least two negative lens components L21 and L22 and having the focusing function satisfy the following condition:

$$0.13 < f_{22}/f_{21} < 0.35, \quad (5)$$

where
$f_{21}$: the focal length of the negative lens component L21 in the second lens unit G2,
$f_{22}$: the focal length of the negative lens component L22 in the second lens unit G2.

Expression (5) is a condition regarding the optical power distribution of the first negative lens component L21 and second negative lens component L22 in the second lens unit G2 as the focusing unit, and is for securing a good imaging performance over infinity to a close distance.

If the lower limit of expression (5) is exceeded, the fluctuation of spherical aberration during short distance focusing will become very great and it will become difficult to secure the focusing performance. If conversely the upper limit of expression (5) is exceeded, the bending of spherical aberration during focusing will become great and again, a sufficient focusing performance cannot be maintained.

Furthermore, to suppress the fluctuations of aberrations during focusing, it is desirable that the following condition be further satisfied:

$$-1.3 < (Rb+Ra)/(Rb-Ra) < 3.0, \quad (6)$$

where
$Ra$: the radius of curvature of the object side surface of the first negative lens component L21 in the second lens unit G2,
$Rb$: the radius of curvature of the image side surface of the second negative lens component L22 in the second lens unit G2.

If the upper limit of expression (6) is exceeded, the refractive power of the negative lens component L21 in the second lens unit G2 will become weak and the fluctuation of spherical aberration during short distance focusing will become very great, and it will become difficult to secure the focusing performance. If conversely, the lower limit of expression (6) is exceeded, the radius of curvature Rb of the image side surface of the negative lens component L22 in the second lens unit G2 will become too small, whereby the bending of spherical aberration will become great over infinity to a close distance. Consequently, the imaging performance will be deteriorated, and this is not preferable.

Further, to achieve good aberration correction during short distance focusing in the present invention, it is more desirable that the following condition be satisfied:

$$R_{21} < 0, \tag{7}$$

where $R_{21}$: the radius of curvature of that surface of the second lens unit G2 which is most adjacent to the object side.

If this expression (7) is departed from, the negative power of the negative lens component L21 in the second lens unit G2 will tend to become strong, and this will become approximate to the case where the lower limit of expression (5) above is exceeded. Accordingly, it will become difficult to sufficiently and reliably suppress the fluctuation of spherical aberration during short distance focusing.

Description will now be made of the third lens unit G3 having the imaging performance.

Where as shown in the first to seventh embodiments (FIGS. 1 to 7), the third lens unit G3 is comprised of a positive lens component L3, it is desirable that the third lens unit G3 be designed to satisfy the following expression (8) regarding the residual aberrations:

$$0 < R_1 + 0.9 R_2 \tag{8}$$

where $R_1$: the radius of curvature of the object side lens surface of the positive lens component in the third lens unit, $R_2$: the radius of curvature of the image side lens surface of the positive lens component in the third lens unit.

Expression (8) regards the radius of curvature of the object side lens surface of the positive lens component L3 in the third lens unit G3 and the radius of curvature of the image side lens surface of the third lens unit, and is a conditional expression which prescribes an appropriate shape of the positive lens component L3 in the third lens unit. If expression (8) is not satisfied, the coma of the lower side will become great positively, and this is not preferable.

Also, in the present invention, in order to make the optical system compact, when the focal length of the entire system is F and the full length of the optical system is L, it is preferable that the following condition be satisfied:

$$0.68 < L/F < 0.93.$$

If the lower limit of this expression is exceeded, the full length of the lens will become too short relative to the combined focal length of the entire system and therefore, the chromatic coma of the lower side will become great, and this is not preferable. If the upper limit of this expression is exceeded, the full length will become great, and this is not preferable.

Figure 3:
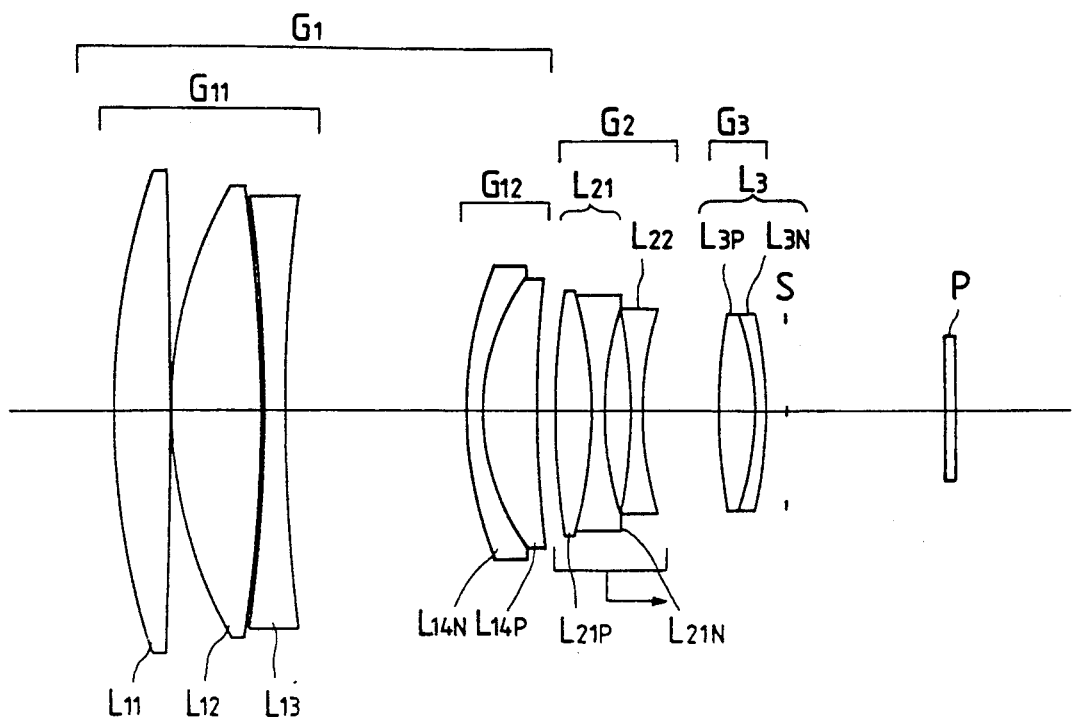
FIG. 3 is a lens construction view showing a third embodiment of the present invention.

Also, where as shown in FIGS. 3 and 6, the third lens unit G3 is constructed as a cemented lens comprising, in succession from the object side, a biconvex positive lens L3P and a negative meniscus lens L3N having its concave surface facing the object side, if the refractive index and Abbe number of the biconvex lens L3P are nb and νb, respectively, it is preferable that the following conditions be satisfied:

$$nb < 1.58 \tag{9}$$

$$45 < νb. \tag{10}$$

If expression (9) is departed from, Petzual sum will become great negatively, and this is not preferable.

If expression (10) is departed from, it will be difficult to correct on-axis chromatic aberration, particularly secondary chromatic aberration, with the construction remaining comprised of a small number of lenses, and this is not preferable.

Further, it is the simplest construction to construct the third lens unit G3 of a single lens L3 as shown in FIGS. 1, 2, 4, 5 and 7, and if in this case, the lens shape is a biconvex positive lens and the refractive index and Abbe number thereof are nc and νc, respectively, it is desirable that the following conditions be satisfied:

$$nc < 1.55 \tag{11}$$

$$νc > 50. \tag{12}$$

If expression (11) is departed from, Petzval sum will become great negatively and therefore, it will be difficult to construct the third lens unit G3 of a single lens, and this is not preferable.

If expression (12) is departed from, on-axis chromatic aberration, particularly secondary chromatic aberration, will become great, and this is not preferable.

Also, it is good that as the more preferable construction of the positive third lens unit G3, as shown in FIGS. 8 to 10, the third lens unit G3 is comprised, in succession from the object side, of a positive lens component L31, a negative meniscus lens component L32 having its concave surface facing the object side, and a positive lens component L33 having its convex surface facing the image side. In this case, when the refractive index and Abbe number of the positive lens component L31 in the third lens unit G3 which is most adjacent to the object side are nb and νb, respectively, it is more preferable that the following conditions be satisfied:

$$nb < 1.58 \tag{13}$$

$$45 < νb. \tag{14}$$

If expression (13) is departed from, Petzval sum will become great negatively, and this is not preferable. If expression (14) is departed from, it will be difficult to correct on-axis chromatic aberration, particularly secondary chromatic aberration, with the construction remaining comprised of a small number of lenses, and this is not preferable.

The schematic constructions of the first to seventh embodiments of the present invention shown in FIGS. 1 to 7 and the eighth to tenth embodiments of the present invention shown in FIGS. 8 to 10 will now be described.

Figure 1:
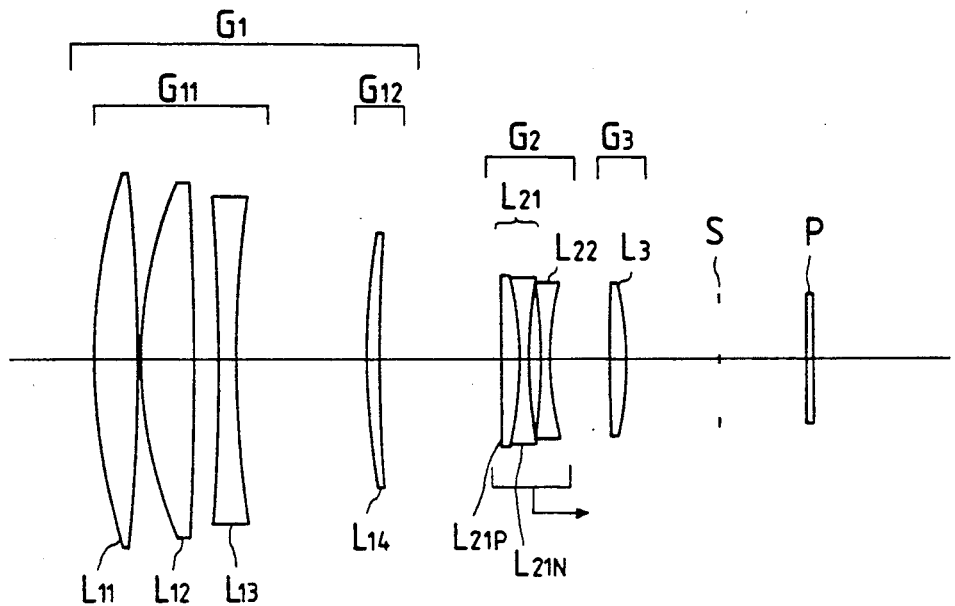
FIG. 1 is a lens construction view showing a first embodiment of the present invention.

In the first embodiment shown in FIG. 1, the rearward unit G12 in the first lens unit G1 is comprised of a lens, i.e., a positive meniscus lens L14 having its convex surface facing the object side. The third lens unit G3 is also comprised of a biconvex lens L3. Focusing is effected by the second lens unit G2. Here, a fixed filter P is added at a location most adjacent to the image side.

Figure 2:
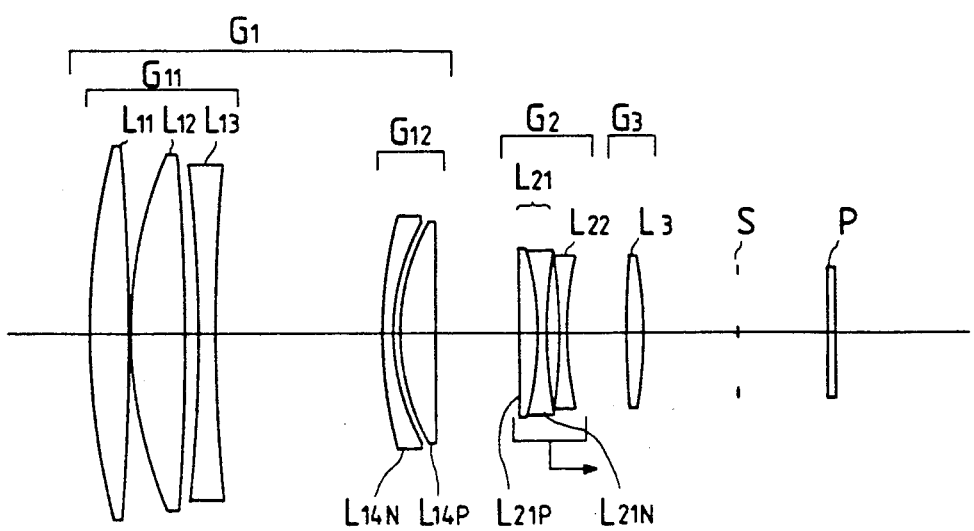
FIG. 2 is a lens construction view showing a second embodiment of the present invention.

In the second embodiment shown in FIG. 2, the rearward unit G12 in the first lens unit G1 is comprised, in succession from the object side, of a negative meniscus lens L14N having its convex surface facing the object side, and a positive meniscus lens L14P having its convex surface facing the object side, said lenses L14N and L14P being disposed with an air gap therebetween. The third lens unit G3 is comprised of a biconvex lens L3. Here, a fixed filter P is added at a location most adjacent to the image side. Focusing is effected by the second lens unit G2.

In the third embodiment shown in FIG. 3 and the sixth embodiment shown in FIG. 6, the rearward unit G12 in the first lens unit G1 is comprised, in succession from the object side, of a negative meniscus lens L14N having its convex surface facing the object side, and a positive meniscus lens L14P having its convex surface facing the object side, said lenses L14N and L14P being cemented together. The third lens unit G3 is comprised, in succession from the object side, of a biconvex lens L3P and a negative meniscus lens L3N having its concave surface facing the object side, said lenses L3P and L3N being cemented together. Focusing is effected by the second lens unit G2. A fixed filter P is added at a location most adjacent to the image side.

Figure 4:
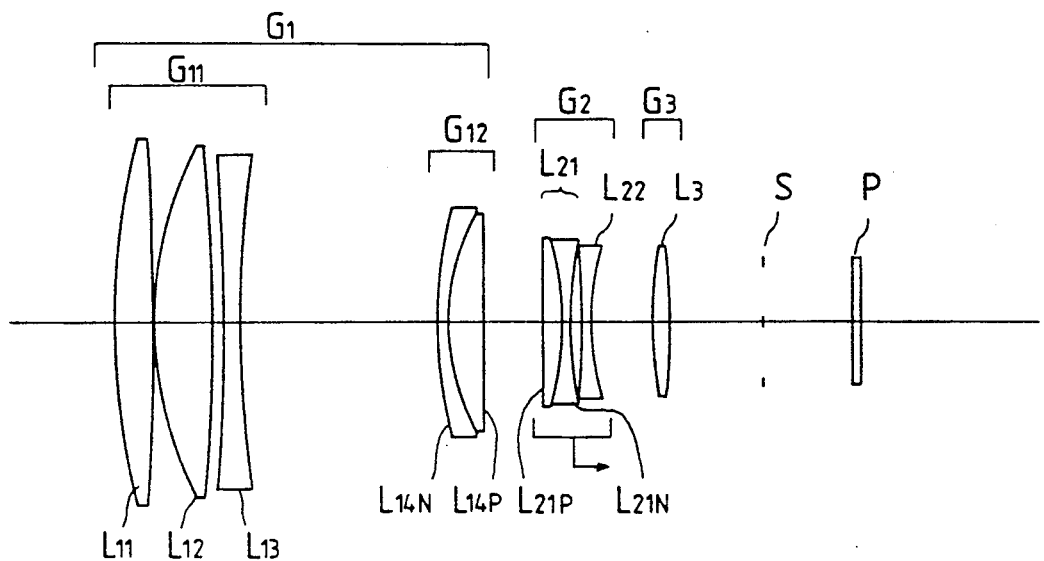
FIG. 4 is a lens construction view showing a fourth embodiment of the present invention.

In the fourth embodiment shown in FIG. 4 and the seventh embodiment shown in FIG. 7, the rearward unit G12 in the first lens unit G1 is comprised, in succession from the object side, a negative meniscus lens L14N having its convex surface facing the object side, and a positive meniscus lens L14P having its convex surface facing the object side, said lenses L14N and L14P being cemented together. The third lens unit G3 is comprised of a biconvex lens L3. Particularly the radii of curvature $R_1$ and $R_2$ of the both surfaces are $R_1 = R_2$, thereby making this lens easy to work. Focusing is effected by the second lens unit G2. A fixed filter P is added at a location most adjacent to the image side.

Figure 5:
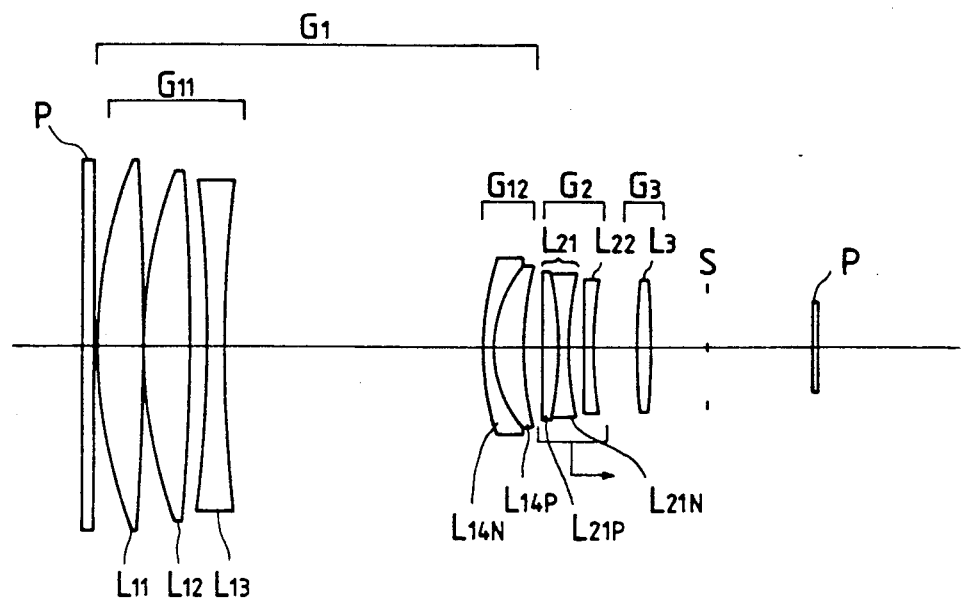
FIG. 5 is a lens construction view showing a fifth embodiment of the present invention.

In the fifth embodiment shown in FIG. 5, the rearward unit G12 in the first lens unit G1 is comprised, in succession from the object side, of a negative meniscus lens L14N having its convex surface facing the object side, and a positive meniscus lens L14P having its convex surface facing the object side, said lenses L14N and L14P being cemented together. The third lens unit G3 is comprised of a biconvex lens L3. Focusing is effected by the second lens unit G2. Fixed filters P are added at a location most adjacent to the object side and a location most adjacent to the image side, respectively.

The numerical values of the first to seventh embodiments of the present invention are given below. In the tables below, the numbers at the left end represent the order from the object side, r represents the radius of curvature of each lens surface, d represents the spacing between adjacent lens surfaces, n and $\nu$ represent the refractive index and Abbe number, respectively, for d line ($\lambda = 587.6$ nm). F represents the focal length of the entire system, Fno represents F number, $\beta$ represents the photographing magnification, and D0 represents the distance from the object to the first lens surface.

TABLE 1

[First Embodiment]

F = 392.0
Fno = 3.6
$\Delta x (\beta = -0.13) = 13.0$

| | r | d | $\nu$ | n |
|---|---|---|---|---|
| 1 | 198.577 | 13.00 | 82.6 | 1.49782 |
| 2 | −550.482 | 1.00 | | |
| 3 | 131.746 | 16.60 | 82.6 | 1.49782 |
| 4 | −1037.798 | 7.56 | | |
| 5 | −555.893 | 5.20 | 31.6 | 1.75692 |
| 6 | 304.686 | 41.13 | | |
| 7 | 245.724 | 3.50 | 82.6 | 1.49782 |
| 8 | 551.583 | 37.38 | | |
| 9 | −1528.622 | 5.70 | 32.2 | 1.67270 |
| 10 | −100.624 | 2.50 | 64.1 | 1.51680 |
| 11 | 130.475 | 3.85 | | |
| 12 | −200.681 | 2.50 | 60.7 | 1.56384 |
| 13 | 81.646 | 18.41 | | |
| 14 | 378.614 | 5.70 | 82.6 | 1.49782 |
| 15 | −97.258 | 56.50 | | |
| 16 | ∞ | 2.00 | 64.1 | 1.51680 |
| 17 | ∞ | 96.50 | | |

F = 392.0043  $\beta$ = −.1296

| D0 | ∞ | 3207.1651 |
|---|---|---|
| d8 | 37.3781 | 50.3535 |
| d13 | 96.4979 | 96.5008 |

Numerical values corresponding to the conditional expresssions are shown below.

$f_1$ = 197.75
$\Phi$ = 109.8
$\Phi/f_1$ = 0.555
$f_1/F$ = 0.504
$f_{21}/f_{22}$ = 0.292
$R_1 + 0.9R_2$ = 291.08

TABLE 2

[Second Embodiment]

F = 392.0
Fno = 3.6
$\Delta x (\beta = -0.13) = 13.0$

| | r | d | $\nu$ | n |
|---|---|---|---|---|
| 1 | 204.548 | 11.80 | 82.6 | 1.49782 |
| 2 | −933.163 | 1.00 | | |
| 3 | 137.181 | 16.60 | 82.6 | 1.49782 |
| 4 | −741.847 | 4.10 | | |
| 5 | −602.191 | 5.20 | 35.2 | 1.74950 |
| 6 | 378.609 | 52.18 | | |
| 7 | 122.943 | 3.50 | 46.8 | 1.76684 |
| 8 | 68.550 | 2.00 | | |
| 9 | 67.730 | 10.40 | 65.7 | 1.46450 |
| 10 | 506.871 | 27.08 | | |
| 11 | −536.039 | 5.70 | 32.2 | 1.67270 |
| 12 | −89.868 | 2.50 | 64.1 | 1.51680 |
| 13 | 122.103 | 3.85 | | |
| 14 | −216.174 | 2.50 | 53.5 | 1.54739 |
| 15 | 88.049 | 18.33 | | |
| 16 | 228.492 | 5.70 | 64.1 | 1.51680 |
| 17 | −123.591 | 56.50 | | |
| 18 | ∞ | 2.00 | 64.1 | 1.51680 |
| 19 | ∞ | 95.95 | | |

F = 392.0050  $\beta$ = −.1300

| D0 | ∞ | 3200.9989 |
|---|---|---|
| d10 | 27.0818 | 40.0572 |
| d15 | 18.3338 | 5.3584 |
| d19 | 95.9528 | 95.9528 |

Numerical values corresponding to the conditional expressions are shown below.

$f_1$ = 197.75
$\Phi$ = 109.8
$\Phi/f_1$ = 0.555
$f_1/F$ = 0.504
$f_{21}/f_{22}$ = 0.504

TABLE 2-continued

[Second Embodiment]

$R_1 + 0.9R_2 = 117.26$

TABLE 3

[Third Embodiment]

$F = 294.0$
$Fno = 2.9$
$\Delta x (\beta = -0.13) = 10.9$

|   | r | d | ν | n |
|---|---|---|---|---|
| 1 | 156.233 | 12.20 | 82.6 | 1.49782 |
| 2 | −1806.226 | .10 | | |
| 3 | 98.943 | 19.30 | 82.6 | 1.49782 |
| 4 | −385.600 | .78 | | |
| 5 | −403.319 | 4.60 | 35.2 | 1.74950 |
| 6 | 301.384 | 39.94 | | |
| 7 | 83.928 | 3.10 | 46.8 | 1.76684 |
| 8 | 45.936 | 12.50 | 65.7 | 1.46450 |
| 9 | 220.022 | 3.98 | | |
| 10 | 161.322 | 8.40 | 32.2 | 1.67270 |
| 11 | −90.593 | 2.30 | 56.4 | 1.50137 |
| 12 | 62.128 | 6.31 | | |
| 13 | −104.466 | 2.30 | 46.4 | 1.58267 |
| 14 | 66.096 | 16.84 | | |
| 15 | 112.382 | 8.20 | 49.0 | 1.53172 |
| 16 | −64.652 | 2.20 | 33.9 | 1.80384 |
| 17 | −98.465 | 40.40 | | |
| 18 | ∞ | 2.00 | 64.1 | 1.51680 |
| 19 | ∞ | 72.88 | | |

$F = 293.9725 \quad \beta = -.1300$

| | | |
|---|---|---|
| d0 | ∞ | 2423.7514 |
| d9 | 3.9816 | 14.8725 |
| d14 | 16.8403 | 5.9493 |
| d19 | 72.8818 | 72.8818 |

Numerical values corresponding to the conditional expressions are shown below.

$f_1 = 157.00$
$\Phi = 101.9$
$\Phi/f_1 = 0.649$
$f_{21}/f_{22} = 0.125$
$f_1/F = 0.534$
$R_1 + 0.9R_2 = 23.76$

TABLE 4

[Fourth Embodiment]

$F = 392.0$
$Fno = 3.56$
$\Delta x (\beta = -0.13) = 13.0$

|   | r | d | ν | n |
|---|---|---|---|---|
| 1 | 212.720 | 11.80 | 82.6 | 1.49782 |
| 2 | −850.437 | 1.00 | | |
| 3 | 129.181 | 16.60 | 82.6 | 1.49782 |
| 4 | −726.621 | 4.10 | | |
| 5 | −594.328 | 5.20 | 35.2 | 1.74950 |
| 6 | 341.228 | 60.59 | | |
| 7 | 123.774 | 3.50 | 46.8 | 1.76684 |
| 8 | 67.389 | 10.40 | 65.7 | 1.46450 |
| 9 | 711.769 | 19.51 | | |
| 10 | −6991.000 | 5.70 | 32.2 | 1.67270 |
| 11 | −97.087 | 2.50 | 64.1 | 1.51680 |
| 12 | 110.331 | 3.85 | | |
| 13 | −233.088 | 2.50 | 60.7 | 1.56384 |
| 14 | 80.666 | 19.59 | | |
| 15 | 154.427 | 5.70 | 82.6 | 1.49782 |
| 16 | −154.427 | 56.50 | | |
| 17 | ∞ | 2.00 | 64.1 | 1.51680 |
| 18 | ∞ | 95.36 | | |

$F = 392.0052 \quad \beta = -.1300$

| | | |
|---|---|---|
| D0 | ∞ | 3201.7637 |
| d9 | 19.5072 | 32.4826 |
| d14 | 19.5946 | 6.6192 |
| d18 | 95.3650 | 95.3650 |

Numerical values corresponding to the conditional expressions are shown below.

$f_1 = 197.75$

TABLE 4-continued

[Fourth Embodiment]

$\Phi = 109.8$
$\Phi/f_1 = 0.555$
$f_1/F = 0.504$
$f_{21}/f_{22} = 0.335$
$R_1 + 0.9R_2 = 15.44$

TABLE 5

[Fifth Embodiment]

$F = 588.0$
$Fno = 4.1$
$\Delta x (\beta = -0.13) = 13.3$

|   | r | d | ν | n |
|---|---|---|---|---|
| 1 | ∞ | 5.00 | 64.1 | 1.51680 |
| 2 | ∞ | 1.20 | | |
| 3 | 201.438 | 18.00 | 82.6 | 1.49782 |
| 4 | −1821.902 | .90 | | |
| 5 | 201.189 | 19.00 | 82.6 | 1.49782 |
| 6 | −794.165 | 6.60 | | |
| 7 | −627.182 | 7.00 | 31.7 | 1.75692 |
| 8 | 551.955 | 103.43 | | |
| 9 | 101.170 | 5.00 | 54.0 | 1.71300 |
| 10 | 49.452 | 13.00 | 67.9 | 1.59319 |
| 11 | 145.498 | 7.21 | | |
| 12 | −90000.000 | 7.00 | 25.4 | 1.80518 |
| 13 | −122.159 | 3.30 | 54.0 | 1.71300 |
| 14 | 110.402 | 6.90 | | |
| 15 | −1527.933 | 3.30 | 53.8 | 1.69350 |
| 16 | 130.260 | 17.88 | | |
| 17 | 218.270 | 7.00 | 82.6 | 1.49782 |
| 18 | −187.896 | 65.20 | | |
| 19 | ∞ | 2.00 | 64.1 | 1.51680 |
| 20 | ∞ | 135.31 | | |

$F = 588.0001 \quad \beta = -.1300$

| | | |
|---|---|---|
| d0 | ∞ | 4756.3500 |
| d11 | 7.2137 | 20.4845 |
| d16 | 17.8751 | 4.6043 |
| d20 | 93.3069 | 93.3069 |

Numerical values corresponding to the conditional expressions are shown below.

$f_1 = 197.75$
$\Phi = 109.8$
$\Phi/f_1 = 0.594$
$f_1/F = 0.417$
$f_{21}/f_{22} = 0.986$
$R_1 + 0.9R_2 = 49.16$

TABLE 6

[Sixth Embodiment]

$F = 294.0$
$Fno = 2.9$
$\Delta x (\beta = -0.13) = 10.9$

|   | r | d | ν | n |
|---|---|---|---|---|
| 1 | 157.463 | 12.20 | 82.6 | 1.49782 |
| 2 | −1682.641 | .10 | | |
| 3 | 98.632 | 19.30 | 82.6 | 1.49782 |
| 4 | −387.044 | 1.00 | | |
| 5 | −401.055 | 4.60 | 35.2 | 1.74950 |
| 6 | 300.368 | 39.60 | | |
| 7 | 84.165 | 3.10 | 46.8 | 1.76684 |
| 8 | 46.165 | 12.50 | 65.7 | 1.46450 |
| 9 | 219.377 | 3.88 | | |
| 10 | 158.047 | 8.40 | 32.2 | 1.67270 |
| 11 | −91.089 | 2.30 | 56.4 | 1.50137 |
| 12 | 62.149 | 6.31 | | |
| 13 | −103.795 | 2.30 | 46.4 | 1.58267 |
| 14 | 65.621 | 16.81 | | |
| 15 | 112.522 | 8.20 | 59.0 | 1.51823 |
| 16 | −64.444 | 2.20 | 49.4 | 1.77279 |
| 17 | −96.198 | 35.00 | | |
| 18 | ∞ | 2.00 | 64.1 | 1.51680 |
| 19 | ∞ | 78.31 | | |

$F = 293.9708 \quad \beta = -.1300$

| | | |
|---|---|---|
| D0 | ∞ | 2423.9264 |

TABLE 6-continued

[Sixth Embodiment]

| | | |
|---|---|---|
| d9 | 3.8820 | 14.7729 |
| d14 | 16.8091 | 5.9181 |
| d27 | 195.9549 | 195.9549 |

Numerical values corresponding to the conditional expressions are shown below.

$f_1 = 157.00$
$\Phi = 101.9$
$\Phi/f_1 = 0.649$
$f_1/F = 0.534$
$f_{21}/f_{22} = 0.118$
$R_1 + 0.9R_2 = 25.94$

TABLE 7

[Seventh Embodiment]

$F = 392.0$
$Fno = 3.6$
$\Delta x (\beta = -0.13) = 13.0$

| | r | d | ν | n |
|---|---|---|---|---|
| 1 | 233.537 | 11.80 | 82.6 | 1.49782 |
| 2 | −744.832 | 1.00 | | |
| 3 | 132.172 | 16.60 | 82.6 | 1.49782 |
| 4 | −712.757 | 2.50 | | |
| 5 | −622.601 | 5.20 | 35.2 | 1.74950 |
| 6 | 380.065 | 65.83 | | |
| 7 | 130.032 | 3.50 | 52.3 | 1.74810 |
| 8 | 67.822 | 10.40 | 82.6 | 1.49782 |
| 9 | 495.828 | 18.24 | | |
| 10 | −90000.000 | 5.70 | 32.2 | 1.67270 |
| 11 | −95.818 | 2.50 | 64.1 | 1.51680 |
| 12 | 110.854 | 3.85 | | |
| 13 | −216.517 | 2.50 | 60.7 | 1.56384 |
| 14 | 81.169 | 19.67 | | |
| 15 | 154.427 | 5.70 | 82.6 | 1.49782 |
| 16 | −154.427 | 56.50 | | |
| 17 | ∞ | 2.00 | 64.1 | 1.51680 |
| 18 | ∞ | 95.36 | | |

$F = 392.0040 \; \beta = -.1300$

| | | |
|---|---|---|
| D0 | ∞ | 3198.9257 |
| d9 | 18.2409 | 31.2163 |
| d14 | 19.6667 | 6.6913 |
| d18 | 95.3639 | 95.3639 |

Numerical values corresponding to the conditional expressions are shown below.

$f_1 = 197.75$
$\Phi = 109.8$
$\Phi/f_1 = 0.555$
$f_1/F = 0.504$
$f_{21}/f_{22} = 0.316$
$R_1 + 0.9R_2 = 15.44$

In each of the first to seventh embodiments, an aperture stop S is provided immediately forwardly of the fixed filter P proximate the image plane, but alternatively, it may be provided immediately forwardly of the second lens unit.

Also, as shown in each of the first to seventh embodiments, the amount of movement Ax of the second lens unit by short distance photographing is achieved by the second lens unit being moved by a very small amount toward the image plane side along the optical axis, in spite of the photographing magnification of each embodiment being $\beta = -0.13$.

By transferring the air gap of the second lens unit with respect to the third lens unit toward the image side as much as permitted, it is possible to focus the second lens unit on a shorter object point.

Further, the image stabilizing effect can be obtained by moving the third lens unit in a direction perpendicular to the optical axis.

FIGS. 8, 9 and 10 show the lens constructions of the eighth to tenth embodiments of the present invention, and each of these embodiments, like the first to seventh embodiments, is comprised of a first lens unit G1 of positive refractive power, a second lens unit G2 of negative refractive power and a third lens unit G3 of positive refractive power. A substantially afocal system is formed by the first lens unit G1 and the second lens unit G2, and the second lens unit G2 is moved toward the image side during focusing from infinity to a short distance.

In each of these embodiments, the first lens unit G1 comprises a forward unit G11 comprised of a biconvex positive lens L11 (a positive first lens component), a positive lens L12 (a positive second lens component) having its surface of sharper curvature facing the object side and a biconcave negative lens L13 (a negative third lens component), and a rearward unit G12 comprising a positive fourth lens component L14. The second lens unit G2 is comprised of a negative lens component L21 comprising a positive lens L21P having its surface of sharper curvature facing the image side and a biconcave negative lens L21N cemented thereto, and a biconcave negative lens L22 (a negative lens component), and the third lens unit G3 is comprised of a positive lens L31 (a positive lens component), a negative meniscus lens L32 (a negative lens component) having its convex surface facing the image side, and a positive lens L33 (a positive lens component).

The differences between these embodiments will now be described. In the eighth and ninth embodiments shown in FIGS. 8 and 9, respectively, the positive lens component L14 constituting the rearward unit G12 of the first lens unit G1 is comprised of a negative meniscus lens L14N having its convex surface facing the object side and a positive meniscus lens L14P cemented thereto and having its convex surface facing the object side. In the tenth embodiment shown in FIG. 10, the positive lens component L14 constituting the rearward unit G12 of the first lens unit G1 is comprised of a biconvex positive lens having weak refractive power.

In each of these embodiments, an aperture stop S is disposed on the image side of the third lens unit G3.

The numerical values of the eighth to tenth embodiments of the present invention are given below. In the tables below, the numbers at the left end represent the order from the object side, r represents the radius of curvature of each lens surface, d represents the spacing between adjacent lens surfaces, n and ν represent the refractive index and Abbe number, respectively, for d line (λ=587.6 nm), F represents the focal length of the entire system, Fno represents F number, β represents the photographing magnification, and D0 represents the distance from the object to the first lens surface.

TABLE 8

[Eighth Embodiment]

$F = 294.0, Fno = 2.9$

| | r | d | ν | n |
|---|---|---|---|---|
| 1 | 117.124 | 14.40 | 82.6 | 1.49782 |
| 2 | 9945.000 | 0.30 | | |
| 3 | 121.736 | 16.80 | 82.6 | 1.49782 |
| 4 | −410.068 | 4.10 | | |
| 5 | −335.183 | 4.70 | 35.2 | 1.74950 |
| 6 | 480.374 | (d6) | | |
| 7 | 105.825 | 3.50 | 55.6 | 1.69680 |
| 8 | 35.452 | 14.40 | 67.9 | 1.59319 |
| 9 | 180.758 | (d9) | | |
| 10 | −9945.000 | 6.60 | 33.9 | 1.80384 |
| 11 | −80.453 | 2.30 | 61.0 | 1.58913 |
| 12 | 119.561 | 5.10 | | |
| 13 | −172.119 | 2.30 | 57.5 | 1.67025 |

TABLE 8-continued

[Eighth Embodiment]

| | | | | |
|---|---|---|---|---|
| 14 | 65.626 | (d14) | | |
| 15 | 153.713 | 7.60 | 82.6 | 1.49782 |
| 16 | −70.534 | 2.50 | | |
| 17 | −54.182 | 2.30 | 25.5 | 1.80458 |
| 18 | −174.411 | 9.40 | | |
| 19 | −280.977 | 5.40 | 28.2 | 1.74000 |
| 20 | −67.273 | (Bf) | | |

| F = 293.9647 β = −0.1418 | | |
|---|---|---|
| D0 | ∞ | 2228.5485 |
| d6 | 34.6628 | 34.6628 |
| d9 | 5.1340 | 16.0229 |
| d14 | 15.8406 | 4.9517 |
| Bf | 114.1141 | 114.1140 |

When the distance from the object to the image plane is R, the amount of movement Δx of the focusing unit from infinity to a close distance R=2500 (β=−0.14) is 10.89. Numerical values corresponding to the conditional expressions are shown below.

$\phi/f_1 = 0.678$, $f_1/F = 0.511$, $f_{22}/f_{21} = 0.164$
$(R_b + R_a)/(R_b - R_a) = -0.98$, $R_{21} = -9945.000$
$na = 1.59319$, $\nu_a = 67.87$, $nb = 1.49782$, $\nu_b = 82.52$.

TABLE 9

[Ninth Embodiment]

F = 294.0, Fno = 2.9

| | r | d | ν | n |
|---|---|---|---|---|
| 1 | 117.164 | 14.40 | 82.6 | 1.49782 |
| 2 | 13032.974 | 1.80 | | |
| 3 | 116.641 | 16.80 | 82.6 | 1.49782 |
| 4 | −416.673 | 4.10 | | |
| 5 | −336.065 | 4.70 | 35.2 | 1.74950 |
| 6 | 424.016 | (d6) | | |
| 7 | 83.576 | 3.50 | 55.5 | 1.69680 |
| 8 | 39.318 | 13.90 | 70.4 | 1.48749 |
| 9 | 184.818 | (d9) | | |
| 10 | −9945.000 | 6.60 | 33.9 | 1.80384 |
| 11 | −79.352 | 2.30 | 60.7 | 1.56384 |
| 12 | 101.693 | 4.60 | | |
| 13 | −144.133 | 2.30 | 58.5 | 1.65160 |
| 14 | 69.797 | (d14) | | |
| 15 | 153.126 | 7.60 | 69.9 | 1.51860 |
| 16 | −63.142 | 2.50 | | |
| 17 | −50.501 | 2.30 | 25.4 | 1.80518 |
| 18 | −260.388 | 8.70 | | |
| 19 | −512.873 | 5.40 | 27.6 | 1.74077 |
| 20 | −67.461 | (Bf) | | |

| F = 293.9976 β = −0.1418 | | |
|---|---|---|
| D0 | ∞ | 2229.1145 |
| d6 | 33.5998 | 33.5998 |
| d9 | 5.0165 | 15.9030 |
| d14 | 15.8316 | 4.9451 |
| Bf | 114.9362 | 114.9363 |

When the distance from the object to the image plane is R, the amount of movement Δx of the focusing unit from infinity to a close distance R=2500 (β=−0.14) is 10.89. Numerical values corresponding to the conditional expressions are shown below.

$\phi/f_1 = 0.678$, $f_1/F = 0.511$, $f_{22}/f_{21} = 0.185$
$(R_b + R_a)/(R_b - R_a) = -0.98$, $R_{21} = -99.45.000$
$na = 1.48749$, $\nu_a = 70.41$, $nb = 1.51860$, $\nu_b = 69.98$.

TABLE 10

[Tenth Embodiment]

F = 392.3, Fno = 3.6

| | r | d | ν | n |
|---|---|---|---|---|
| 1 | 154.626 | 17.00 | 82.6 | 1.49782 |
| 2 | −450.322 | 0.10 | | |
| 3 | 155.975 | 16.60 | 82.6 | 1.49782 |
| 4 | −1200.804 | 10.10 | | |

TABLE 10-continued

[Tenth Embodiment]

| | | | | |
|---|---|---|---|---|
| 5 | −343.155 | 5.20 | 31.6 | 1.75692 |
| 6 | 365.182 | (d6) | | |
| 7 | 556.699 | 3.50 | 82.6 | 1.49782 |
| 8 | −2128.032 | (d8) | | |
| 9 | −550.000 | 5.70 | 28.6 | 1.79504 |
| 10 | −74.260 | 2.50 | 53.7 | 1.69350 |
| 11 | 500.868 | 3.80 | | |
| 12 | −215.246 | 2.50 | 53.7 | 1.69350 |
| 13 | 88.051 | (d13) | | |
| 14 | −395.116 | 7.60 | 82.6 | 1.49782 |
| 15 | −59.883 | 2.50 | | |
| 16 | −63.588 | 2.30 | 25.5 | 1.80458 |
| 17 | −99.507 | 2.60 | | |
| 18 | −404.339 | 5.40 | 28.2 | 1.74000 |
| 19 | −130.987 | (Bf) | | |

| F = 392.3079 β = −0.1325 | | |
|---|---|---|
| D0 | ∞ | 3159.0217 |
| d6 | 30.6654 | 30.6654 |
| d8 | 40.1391 | 53.3498 |
| d13 | 29.1828 | 15.9721 |
| Bf | 153.5910 | 153.5910 |

When the distance from the object to the image plane is R, the amount of movement Δx of the focusing unit from infinity to a close distance R=3500 (β=−0.13) is 13.19. Numerical values corresponding to the conditional expressions are shown below.

$\phi/f_1 = 0.559$, $f_1/F = 0.504$, $f_{22}/f_{21} = 0.131$
$(R_b + R_a)/(R_b - R_a) = -0.05$, $R_{21} = -550.000$ $na = 1.49782$,
$\nu_a = 82.52$, $nb = 1.49782$, $\nu_b = 82.52$.

It is seen that in each of the above-described embodiments, the amount of movement of the focusing unit (the second lens unit) by the focusing from infinity to a close distance is small.

According to the present invention, there can be achieved an internal focusing telephoto lens in which the amount of movement of the focusing unit during focusing is held down small and yet which can maintain an excellent imaging performance over infinity to a close distance.

What is claimed is:

1. An internal focusing telephoto lens comprising in the order from the object side:
   a first lens unit of positive refractive power as a whole composed of a front unit of positive refractive power including a positive first lens component, a positive second lens component and a negative third lens component, and a rear unit of positive refractive power which is weaker than that of said front unit composed of a negative meniscus lens whose convex surface faces the object side and a positive meniscus lens whose convex surface faces the object side;
   a second lens unit having negative refractive power and movable along the optical axis for focusing; and
   a third lens unit having positive refractive power and having an imaging function;
   said first lens unit forming a substantially afocal system with said second lens unit and being designed to satisfy the following conditions:

$$0.43 < \phi/f_1 < 0.75$$

$$0.39 < f_1/F < 0.55$$

where

φ: the effective diameter of the object side lens surface of the positive first lens component in the first lens unit,
$f_1$: the focal length of the first lens unit,
F: the focal length of the entire system.

2. An internal focusing telephoto lens according to claim 1, wherein said rear unit in said first lens unit is a lens obtained by cementing a negative meniscus lens to a positive meniscus lens whose convex surface faces the object side.

3. An internal focusing telephoto lens according to claim 1, wherein said positive meniscus lens in said rear unit is designed to satisfy the following conditions:

$$na < 1.60$$

$$va > 65$$

where
$na$: the refractive index of the positive meniscus lens in the rear lens unit;
$va$: the Abbe number of the positive meniscus lens in the rear lens unit.

4. An internal focusing telephoto lens according to claim 3, wherein said third lens unit moves across the optical axis to obtain an image stabilizing effect.

5. An internal focusing telephoto lens according to claim 1, which is designed in accordance with the following data:

| | F = 392.0 | | |
|---|---|---|---|
| | Fno = 3.6 | | |
| | Δx (β = −0.13) = 13.0 | | |
| r | d | ν | n |
| 1 | 204.548 | 11.80 | 82.6 | 1.49782 |
| 2 | −933.163 | 1.00 | | |
| 3 | 137.181 | 16.60 | 82.6 | 1.49782 |
| 4 | −741.847 | 4.10 | | |
| 5 | −602.191 | 5.20 | 35.2 | 1.74950 |
| 6 | 378.609 | 52.18 | | |
| 7 | 122.943 | 3.50 | 46.8 | 1.76684 |
| 8 | 68.550 | 2.00 | | |
| 9 | 67.730 | 10.40 | 65.7 | 1.46450 |
| 10 | 506.871 | 27.08 | | |
| 11 | −536.039 | 5.70 | 32.2 | 1.67270 |
| 12 | −89.868 | 2.50 | 64.1 | 1.51680 |
| 13 | 122.103 | 3.85 | | |
| 14 | −216.174 | 2.50 | 53.5 | 1.54739 |
| 15 | 88.049 | 18.33 | | |
| 16 | 228.492 | 5.70 | 64.1 | 1.51680 |
| 17 | −123.591 | 56.50 | | |
| 18 | ∞ | 2.00 | 64.1 | 1.51680 |
| 19 | ∞ | 95.95 | | |

| F = 392.0050  β = −.1300 | | |
|---|---|---|
| D0 | ∞ | 3200.9989 |
| d10 | 27.0818 | 40.0572 |
| d15 | 18.3338 | 5.3584 |
| d19 | 95.9528 | 95.9528 |

$f_1 = 197.75$
$\Phi = 109.8$
$\Phi/f_1 = 0.555$
$f_1/F = 0.504$
$f_{21}/f_{22} = 0.504$
$R_1 + 0.9R_2 = 117.26$ where the numbers at the left end represent the order from the object side, r represents the radius of curvature of each lens surface, d represents the spacing between adjacent lens surfaces, n represents the refractive index of each lens, ν represents the Abbe number of each lens, Fno represents F number, β represents the photographing magnification, D0 represents the distance from the object to the first lens surface, Δx represents the amount of movement of the second lens unit (the focusing unit) by short distance photographing, $R_1$ represents the radius of curvature of the object side lens surface of the positive lens component in the third lens unit, $R_2$ represents the radius of curvature of the image side lens surface of the positive lens component in the third lens unit, $f_{21}$ represents the focal length of the first negative lens component in the second lens unit, and $f_{22}$ represents the focal length of the second negative lens component in the second lens unit.

6. An internal focusing telephoto lens according to claim 1, which is designed in accordance with the following data:

| | F = 294.0 | | |
|---|---|---|---|
| | Fno = 2.9 | | |
| | Δx (β = −0.13) = 10.9 | | |
| r | d | ν | n |
| 1 | 156.233 | 12.20 | 82.6 | 1.49782 |
| 2 | −1806.226 | .10 | | |
| 3 | 98.943 | 19.30 | 82.6 | 1.49782 |
| 4 | −385.600 | .78 | | |
| 5 | −403.319 | 4.60 | 35.2 | 1.74950 |
| 6 | 301.384 | 39.94 | | |
| 7 | 83.928 | 3.10 | 46.8 | 1.76684 |
| 8 | 45.936 | 12.50 | 65.7 | 1.46450 |
| 9 | 220.022 | 3.98 | | |
| 10 | 161.322 | 8.40 | 32.2 | 1.67270 |
| 11 | −90.593 | 2.30 | 56.4 | 1.50137 |
| 12 | 62.128 | 6.31 | | |
| 13 | −104.466 | 2.30 | 46.4 | 1.58267 |
| 14 | 66.096 | 16.84 | | |
| 15 | 112.382 | 8.20 | 49.0 | 1.53172 |
| 16 | −64.652 | 2.20 | 33.9 | 1.80384 |
| 17 | −98.465 | 40.40 | | |
| 18 | ∞ | 2.00 | 64.1 | 1.51680 |
| 19 | ∞ | 72.88 | | |

| F = 293.9725  β = −.1300 | | |
|---|---|---|
| D0 | ∞ | 2423.7514 |
| d9 | 3.9816 | 14.8725 |
| d14 | 16.8403 | 5.9493 |
| d19 | 72.8818 | 72.8818 |

$f_1 = 157.00$
$\Phi = 101.9$
$\Phi/f_1 = 0.649$
$f_{21}/f_{22} = 0.125$
$f_1/F = 0.534$
$R_1 + 0.9R_2 = 23.76$ where the numbers at the left end represent the order from the object side, r represents the radius of curvature of each lens surface, d represents the spacing between adjacent lens surfaces, n represents the refractive index of each lens, ν represents the Abbe number of each lens, Fno represents F number, β represents the photographing magnification, D0 represents the distance from the object to the first lens surface, Δx represents the amount of movement of the second lens unit (the focusing unit) by short distance photographing, $R_1$ represents the radius of curvature of the object side lens surface of the positive lens component in the third lens unit, $R_2$ represents the radius of curvature of the image side lens surface of the positive lens component in the third lens unit, $f_{21}$ represents the focal length of the first negative lens component in the second lens unit, and $f_{22}$ represents the focal length of the second negative lens component in the second lens unit.

7. An internal focusing telephoto lens according to claim 1, which is designed in accordance with the following data:

| | F = 392.0 | | | |
|---|---|---|---|---|
| | Fno = 3.56 | | | |
| | Δx (β = −0.13) = 13.0 | | | |
| | r | d | ν | n |
| 1 | 212.720 | 11.80 | 82.6 | 1.49782 |
| 2 | −850.437 | 1.00 | | |
| 3 | 129.181 | 16.60 | 82.6 | 1.49782 |
| 4 | −726.621 | 4.10 | | |
| 5 | −594.328 | 5.20 | 35.2 | 1.74950 |
| 6 | 341.228 | 60.59 | | |
| 7 | 123.774 | 3.50 | 46.8 | 1.76684 |
| 8 | 67.389 | 10.40 | 65.7 | 1.46450 |
| 9 | 711.769 | 19.51 | | |
| 10 | −6991.000 | 5.70 | 32.2 | 1.67270 |
| 11 | −97.087 | 2.50 | 64.1 | 1.51680 |
| 12 | 110.331 | 3.85 | | |
| 13 | −233.088 | 2.50 | 60.7 | 1.56384 |
| 14 | 80.666 | 19.59 | | |
| 15 | 154.427 | 5.70 | 82.6 | 1.49782 |
| 16 | −154.427 | 56.50 | | |
| 17 | ∞ | 2.00 | 64.1 | 1.51680 |
| 18 | ∞ | 95.36 | | |

| F = 392.0052 β = −.1300 | | |
|---|---|---|
| D0 | ∞ | 3201.7637 |
| d9 | 19.5072 | 32.4826 |
| d14 | 19.5946 | 6.6192 |
| d18 | 95.3650 | 95.3650 |
| $f_1$ = 197.75 | | |
| Φ = 109.8 | | |
| $Φ/f_1$ = 0.555 | | |
| $f_1/F$ = 0.504 | | |
| $f_{21}/f_{22}$ = 0.335 | | |
| $R_1 + 0.9_2$ = 15.44 | | | where the numbers at the left end represent the order from the object side, r represents the radius of curvature of each lens surface, d represents the spacing between adjacent lens surfaces, n represents the refractive index of each lens, ν represents the Abbe number of each lens, Fno represents F number, β represents the photographing magnification, D0 represents the distance from the object to the first lens surface, Δx represents the amount of movement of the second lens unit (the focusing unit) by short distance photographing, $R_1$ represents the radius of curvature of the object side lens surface of the positive lens component in the third lens unit, $R_2$ represents the radius of curvature of the image side lens surface of the positive lens component in the third lens unit, $f_{21}$ represents the focal length of the first negative lens component in the second lens unit, and $f_{22}$ represents the focal length of the second negative lens component in the second lens unit.

8. An internal focusing telephoto lens according to claim 1, which is designed in accordance with the following data:

| | F = 588.0 | | | |
|---|---|---|---|---|
| | Fno = 4.1 | | | |
| | Δx (β = −0.13) = 13.3 | | | |
| | r | d | ν | n |
| 1 | ∞ | 5.00 | 64.1 | 1.51680 |
| 2 | ∞ | 1.20 | | |
| 3 | 201.438 | 18.00 | 82.6 | 1.49782 |
| 4 | −1821.902 | .90 | | |
| 5 | 201.189 | 19.00 | 82.6 | 1.49782 |
| 6 | −794.165 | 6.60 | | |
| 7 | −627.182 | 7.00 | 31.7 | 1.75692 |
| 8 | 551.955 | 103.43 | | |
| 9 | 101.170 | 5.00 | 54.0 | 1.71300 |
| 10 | 49.452 | 13.00 | 67.9 | 1.59319 |
| 11 | 145.498 | 7.21 | | |
| 12 | −90000.000 | 7.00 | 25.4 | 1.80518 |
| 13 | −122.159 | 3.30 | 54.0 | 1.71300 |

-continued

| 14 | 110.402 | 6.90 | | |
|---|---|---|---|---|
| 15 | −1527.933 | 3.30 | 53.8 | 1.69350 |
| 16 | 130.260 | 17.88 | | |
| 17 | 218.270 | 7.00 | 82.6 | 1.49782 |
| 18 | −187.896 | 65.20 | | |
| 19 | ∞ | 2.00 | 64.1 | 1.51680 |
| 20 | ∞ | 135.31 | | |

| F = 588.0001 β = −.1300 | | |
|---|---|---|
| D0 | ∞ | 4756.3500 |
| d11 | 7.2137 | 20.4845 |
| d16 | 17.8751 | 4.6043 |
| d20 | 93.3069 | 93.3069 |
| $f_1$ = 197.75 | | |
| Φ = 109.8 | | |
| $Φ/f_1$ = 0.594 | | |
| $f_1/F$ = 0.417 | | |
| $f_{21}/f_{22}$ = 0.986 | | |
| $R_1 + 0.9R_2$ = 49.16 | | | wherein the numbers at the left end represent the order from the object side, r represents the radius of curvature of each lens surface, d represents the spacing between adjacent lens surfaces, n represents the refractive index of each lens, ν represents the Abbe number of each lens, Fno represents F number, β represents the photographing magnification, D0 represents the distance from the object to the first lens surface, Δx represents the amount of movement of the second lens unit (the focusing unit) by short distance photographing, $R_1$ represents the radius of curvature of the object side lens surface of the positive lens component in the third lens unit, $R_2$ represents the radius of curvature of the image side lens surface of the positive lens component in the third lens unit, $f_{21}$ represents the focal length of the first negative lens component in the second lens unit, and $f_{22}$ represents the focal length of the second negative lens component in the second lens unit.

9. An internal focusing telephoto lens according to claim 1, which is designed in accordance with the following data:

| | F = 294.0 | | | |
|---|---|---|---|---|
| | Fno = 2.9 | | | |
| | Δx (β = −0.13) = 10.9 | | | |
| | r | d | ν | n |
| 1 | 157.463 | 12.20 | 82.6 | 1.49782 |
| 2 | −1682.641 | .10 | | |
| 3 | 98.632 | 19.30 | 82.6 | 1.49782 |
| 4 | −387.044 | 1.00 | | |
| 5 | −401.055 | 4.60 | 35.2 | 1.74950 |
| 6 | 300.368 | 39.60 | | |
| 7 | 84.165 | 3.10 | 46.8 | 1.76684 |
| 8 | 46.165 | 12.50 | 65.7 | 1.46450 |
| 9 | 219.377 | 3.88 | | |
| 10 | 158.047 | 8.40 | 32.2 | 1.67270 |
| 11 | −91.089 | 2.30 | 56.4 | 1.50137 |
| 12 | 62.149 | 6.31 | | |
| 13 | −103.795 | 2.30 | 46.4 | 1.58267 |
| 14 | 65.621 | 16.81 | | |
| 15 | 112.522 | 8.20 | 59.0 | 1.51823 |
| 16 | −64.444 | 2.20 | 49.4 | 1.77279 |
| 17 | −96.198 | 35.00 | | |
| 18 | ∞ | 2.00 | 64.1 | 1.51680 |
| 19 | ∞ | 78.31 | | |

| F = 293.9708 β = −.1300 | | |
|---|---|---|
| D0 | ∞ | 2423.9264 |
| d9 | 3.8820 | 14.7729 |
| d14 | 16.8091 | 5.9181 |
| d27 | 195.9549 | 195.9549 |
| $f_1$ = 157.00 | | |
| Φ = 101.9 | | |
| $Φ/f_1$ = 0.649 | | |

-continued $f_1/F = 0.534$
$f_{21}/f_{22} = 0.118$
$R_1 + 0.9 R_2 = 25.94$ where the numbers at the left end represent the order from the object side, r represents the radius of curvature of each lens surface, d represents the spacing between adjacent lens surfaces, n represents the refractive index of each lens, $\nu$ represents the Abbe number of each lens, Fno represents F number, $\beta$ represents the photographing magnification, D0 represents the distance from the object to the first lens surface, $\Delta x$ represents the amount of movement of the second lens unit (the focusing unit) by short distance photographing, $R_1$ represents the radius of curvature of the object side lens surface of the positive lens component in the third lens unit, $R_2$ represents the radius of curvature of the image side lens surface of the positive lens component in the third lens unit, $f_{21}$ represents the focal length of the first negative lens component in the second lens unit, and $f_{22}$ represents the focal length of the second negative lens component in the second lens unit.

10. An internal focusing telephoto lens according to claim 1, which is designed in accordance with the following data:

| F = 392.0 | | | |
|---|---|---|---|
| Fno = 3.6 | | | |
| $\Delta x$ ($\beta = -0.13$) = 13.0 | | | |
| | r | d | $\nu$ | n |
| 1 | 233.537 | 11.80 | 82.6 | 1.49782 |
| 2 | −744.832 | 1.00 | | |
| 3 | 132.172 | 16.60 | 82.6 | 1.49782 |
| 4 | −712.757 | 2.50 | | |
| 5 | −622.601 | 5.20 | 35.2 | 1.74950 |
| 6 | 380.065 | 65.83 | | |
| 7 | 130.032 | 3.50 | 52.3 | 1.74810 |
| 8 | 67.822 | 10.40 | 82.6 | 1.49782 |
| 9 | 495.828 | 18.24 | | |
| 10 | −90000.000 | 5.70 | 32.2 | 1.67270 |
| 11 | −95.818 | 2.50 | 64.1 | 1.51680 |
| 12 | 110.854 | 3.85 | | |
| 13 | −216.517 | 2.50 | 60.7 | 1.56384 |
| 14 | 81.169 | 19.67 | | |
| 15 | 154.427 | 5.70 | 82.6 | 1.49782 |
| 16 | −154.427 | 56.50 | | |
| 17 | ∞ | 2.00 | 64.1 | 1.51680 |
| 18 | ∞ | 95.36 | | |

| F = 392.0040 $\beta$ = −.1300 | | |
|---|---|---|
| D0 | ∞ | 3198.9257 |
| d9 | 18.2409 | 31.2163 |
| d14 | 19.6667 | 6.6913 |
| d18 | 95.3639 | 95.3639 |

$f_1 = 197.75$
$\Phi = 109.8$
$\Phi/f_1 = 0.555$
$f_1/F = 0.504$
$f_{21}/f_{22} = 0.316$
$R_1 + 0.9 R_2 = 15.44$ where the numbers at the left end represent the order from the object side, r represents the radius of curvature of each lens surface, d represents the spacing between adjacent lens surfaces, n represents the refractive index of each lens, $\nu$ represents the Abbe number of each lens, Fno represents F number, $\beta$ represents the photographing magnification, D0 represents the distance from the object to the first lens surface, $\Delta x$ represents the amount of movement of the second lens unit (the focusing unit) by short distance photographing, $R_1$ represents the radius of curvature of the object side lens surface of the positive lens component in the third lens unit, $R_2$ represents the radius of curvature of the image side lens surface of the positive lens component in the third lens unit, $f_{21}$ represents the focal length of the first negative lens component in the second lens unit, and $f_{22}$ represents the focal length of the second negative lens component in the second lens unit.

11. An internal focusing telephoto lens according to claim 1, which is designed in accordance with the following data.

| F = 294.0, Fno = 2.9 | | | |
|---|---|---|---|
| | r | d | $\nu$ | n |
| 1 | 117.124 | 14.40 | 82.6 | 1.49782 |
| 2 | 9945.000 | 0.30 | | |
| 3 | 121.736 | 16.80 | 82.6 | 1.49872 |
| 4 | −410.068 | 4.10 | | |
| 5 | −335.183 | 4.70 | 35.2 | 1.74950 |
| 6 | 480.374 | (d6) | | |
| 7 | 105.825 | 3.50 | 55.6 | 1.69680 |
| 8 | 35.452 | 14.40 | 67.9 | 1.59319 |
| 9 | 180.758 | (d9) | | |
| 10 | −9945.000 | 6.60 | 33.9 | 1.80384 |
| 11 | −80.453 | 2.30 | 61.0 | 1.58913 |
| 12 | 119.561 | 5.10 | | |
| 13 | −172.119 | 2.30 | 57.5 | 1.67025 |
| 14 | 65.626 | (d14) | | |
| 15 | 153.713 | 7.60 | 82.6 | 1.49782 |
| 16 | −70.534 | 2.50 | | |
| 17 | −54.182 | 2.30 | 25.5 | 1.80458 |
| 18 | −174.411 | 9.40 | | |
| 19 | −280.977 | 5.40 | 28.2 | 1.74000 |
| 20 | −67.27 | (Bf) | | |

| F = 293.9647 $\beta$ = −0.1418 | | |
|---|---|---|
| D0 | ∞ | 2228.5485 |
| d6 | 34.6628 | 34.6628 |
| d9 | 5.1340 | 16.0229 |
| d14 | 15.8406 | 4.9517 |
| Bf | 144.1141 | 114.1140 | when the distance from the object to the image plane is R, the amount of movement $\Delta x$ of the focusing unit (the second lens unit) from infinity to a close distance R=2500 ($\beta$=−0.14) is 10.89, $\phi/f_1$=0.678, $f_1/F$=0.511, $f_{22}/f_{21}$=0.164, $(R_b+R_a)/(R_b-R_a)$=−0.98, $R_{21}$=−9945.000 na=1.59319, $\nu_a$=67.87, nb=1.49782, $\nu_b$=82.52 where the numbers at the left end represent the order from the object side, r represents the radius of curvature of each lens surface, d represents the spacing between adjacent lens surfaces, n represents the refractive index of each lens, $\nu$ represents the Abbe number of each lens, Fno represents F number, $\beta$ represents the photographing magnification, D0 represents the distance from the object to the first lens surface, $f_{21}$ represents the focal length of the first negative lens component in the second lens unit, $f_{22}$ represents the focal length of the second negative lens component in the second lens unit, Ra represents the radius of curvature the object side surface of the negative first lens component in the second lens unit, Rb represents the radius of curvature of the image side surface of the negative second lens component in the second lens unit, $R_{21}$ represents the radius of curvature of that surface of the second lens unit which is most adjacent to the object side, na represents the refractive index of the positive lens component in the first lens unit, nb represents the refractive index of the positive lens component in the third lens unit which is most adjacent to the object side, $\nu_a$ represents the Abbe number of the positive lens component in the rearward unit of the first lens unit, and $\nu b$ represents the Abbe number of the positive lens component in the third lens unit which is most adjacent to the object side.

12. An internal focusing telephoto lens according to claim 1, which is designed in accordance with the following data:

| F = 294.0, Fno = 2.9 | | | | |
|---|---|---|---|---|
| | r | d | $\nu$ | n |
| 1 | 117.164 | 14.40 | 82.6 | 1.49782 |
| 2 | 13032.974 | 1.80 | | |
| 3 | 116.641 | 16.80 | 82.6 | 1.49782 |
| 4 | −416.673 | 4.10 | | |
| 5 | −336.065 | 4.70 | 35.2 | 1.74950 |
| 6 | 424.016 | (d6) | | |
| 7 | 83.576 | 3.50 | 55.6 | 1.69680 |
| 8 | 39.318 | 13.90 | 70.4 | 1.48749 |
| 9 | 184.818 | (d9) | | |
| 10 | −9945.000 | 6.60 | 33.9 | 1.80384 |
| 11 | −79.352 | 2.30 | 60.7 | 1.56384 |
| 12 | 101.693 | 4.60 | | |
| 13 | −144.133 | 2.30 | 58.5 | 1.65160 |
| 14 | 69.797 | (d14) | | |
| 15 | 153.126 | 7.60 | 69.9 | 1.51860 |
| 16 | −63.142 | 2.50 | | |
| 17 | −50.501 | 2.30 | 25.4 | 1.80518 |
| 18 | −260.388 | 8.70 | | |
| 19 | −512.873 | 5.40 | 27.6 | 1.74077 |
| 20 | −67.461 | (Bf) | | |

| F = 293.9976 $\beta$ = −0.1418 | | |
|---|---|---|
| D0 | $\infty$ | 2229.1145 |
| d6 | 33.5998 | 33.5998 |
| d9 | 5.0165 | 15.9030 |
| d14 | 15.8316 | 4.9451 |
| Bf | 114.9362 | 114.9363 | when the distance from the object to the image plane is R, the amount of movement $\Delta x$ of the focusing unit (the second lens unit) from infinity to a close distance R=2500 ($\beta = -0.14$) is 10.89, $\phi/f_1 = 0.678$, $f_1/F = 0.511$, $f_{22}/f_{21} = 0.185$ $(R_b + R_a)/(R_b − R_a) = −0.98$, $R_{21} = −9945.000$ $na = 1.48749$, $\nu_a = 70.41$, $nb = 1.51860$, $\nu_b = 69.98$ where the numbers at the left end represent the order from the object side, r represents the radius of curvature of each lens surface, d represents the spacing between adjacent lens surfaces, n represents the refractive index of each lens, $\nu$ represents the Abbe number of each lens, Fno represents F number, $\beta$ represents the photographing magnification, D0 represents the distance from the object to the first lens surface, $f_{21}$ represents the focal length of the first negative lens component in the second lens unit, $f_{22}$ represents the focal length of the second negative lens component in the second lens unit, Ra represents the radius of curvature of the object side surface of the negative first lens component in the second lens unit, Rb represents the radius of curvature of the image side surface of the negative second lens component in the second lens unit, $R_{21}$ represents the radius of curvature of that surface of the second lens unit which is most adjacent to the object side, na represents the refractive index of the positive lens component in the rearward unit of the first lens unit, nb represents the refractive index of the positive lens component in the third lens unit which is most adjacent to the object side, $\nu a$ represents the Abbe number of the positive lens component in the rearward unit of the first lens unit, and $\nu b$ represents the Abbe number of the positive lens component in the third lens unit which is most adjacent to the object side.

13. An internal focusing telephoto lens comprising in the order from the object side:
a first lens unit of positive refractive power as a whole composed of a front unit of positive refractive power as a whole including a positive first lens component, a positive second lens component and a negative third lens component, and a rear unit of positive refractive power which is weaker than that of said front unit composed of one positive lens whose convex surface faces the object side;
a second lens unit of negative refractive power and movable along the optical axis for focusing; and
a third lens having positive refractive power and having an imaging function;
said first lens unit forming a substantially afocal system with said second lens unit and being designed to satisfy the following conditions:

$$0.43 < \phi/f_1 < 0.75$$

$$0.39 < f_1/F < 0.55$$

where
$\phi$: the effective diameter of the object side lens surface of the positive first lens component in the first lens unit,
$f_1$: the focal length of the first lens unit,
F: the focal length of the entire system.

14. An internal focusing telephoto lens according to claim 13, which is designed in accordance with the following data:

| F = 392.0 Fno = 3.6 $\Delta x$ ($\beta$ = 31 0.13) = 13.0 | | | | |
|---|---|---|---|---|
| | r | d | $\nu$ | n |
| 1 | 198.577 | 13.00 | 82.6 | 1.49782 |
| 2 | −550.482 | 1.00 | | |
| 3 | 131.746 | 16.60 | 82.6 | 1.49782 |
| 4 | −1037.798 | 7.56 | | |
| 5 | −555.893 | 5.20 | 31.6 | 1.75692 |
| 6 | 304.686 | 41.13 | | |
| 7 | 245.724 | 3.50 | 82.6 | 1.49782 |
| 8 | 551.583 | 37.38 | | |
| 9 | −1528.622 | 5.70 | 32.2 | 1.67270 |
| 10 | −100.624 | 2.50 | 64.1 | 1.51680 |
| 11 | 130.475 | 3.85 | | |
| 12 | −200.681 | 2.50 | 60.7 | 1.56384 |
| 13 | 81.646 | 18.41 | | |
| 14 | 378.614 | 5.70 | 82.6 | 1.49782 |
| 15 | −97.258 | 56.50 | | |
| 16 | $\infty$ | 2.00 | 64.1 | 1.51680 |
| 17 | $\infty$ | 96.50 | | |

| F = 392.0043 $\beta$ = −.1296 | | |
|---|---|---|
| D0 | $\infty$ | 3207.1651 |
| d8 | 37.3781 | 50.3535 |
| d13 | 96.4979 | 96.5008 |

$f_1 = 197.75$
$\Phi = 109.8$
$\Phi/f_1 = 0.555$
$f_1/F = 0.504$
$f_{21}/f_{22} = 0.292$
$R_1 + 0.9 R_2 = 291.08$ where the numbers at the left end represent the order from the object side, r represents the radius of curvature of each lens surface, d represents the spacing between adjacent lens surfaces, n represents the refractive index of each lens, $\nu$ represents the Abbe number of each lens, Fno represents F number, $\beta$ represents the photographing magnification, D0 represents the distance from the object to the first lens surface, $\Delta x$ represents the amount of movement of the second lens unit (the focusing unit) by short distance photographing, $R_1$ represents the radius of curvature of the object side lens surface of the positive lens component in the third lens unit, $R_2$ represents the radius of curvature of the image side lens surface of the positive lens component in the third lens unit, $f_{21}$ represents the focal length of the first negative lens component in the second lens unit, and $f_{22}$ represents the focal length of the second negative lens component in the second lens unit.

15. An internal focusing telephoto lens according to claim 13, which is designed in accordance with the following data:

| F = 392.3, Fno = 3.6 | | | |
|---|---|---|---|
| r | d | ν | n |
| 1 | 154.626 | 17.00 | 82.6 | 1.49782 |
| 2 | −450.322 | 0.10 | | |
| 3 | 155.975 | 16.60 | 82.6 | 1.49782 |
| 4 | −1200.804 | 10.10 | | |
| 5 | −343.155 | 5.20 | 31.6 | 1.75692 |
| 6 | 365.182 | (d6) | | |
| 7 | 556.699 | 3.50 | 82.6 | 1.49782 |
| 8 | −2128.032 | (d8) | | |
| 9 | −550.000 | 5.70 | 28.6 | 1.79504 |
| 10 | −74.260 | 2.50 | 53.7 | 1.69350 |
| 11 | 500.868 | 3.80 | | |
| 12 | −215.246 | 2.50 | 53.7 | 1.69350 |
| 13 | 88.051 | (d13) | | |
| 14 | −395.116 | 7.60 | 82.6 | 1.49782 |
| 15 | −59.883 | 2.50 | | |
| 16 | −63.588 | 2.30 | 25.5 | 1.80458 |
| 17 | −99.507 | 2.60 | | |
| 18 | −404.339 | 5.40 | 28.2 | 1.74000 |
| 19 | −130.987 | (Bf) | | |

| F = 392.3079 β = −0.1325 | | |
|---|---|---|
| D0 | ∞ | 3159.0217 |
| d6 | 30.6654 | 30.6654 |
| d8 | 40.1391 | 53.3498 |
| d13 | 29.1828 | 15.9721 |
| Bf | 153.5910 | 153.5910 | when the distance from the object to the image plane is R, the amount of movement $\Delta x$ of the focusing unit (the second lens unit) from infinity to a close distance $R=3500$ ($\beta=-0.13$) is 13.19, $\phi/f_1=0.559$, $f_1/F=0.504$, $f_{22}/f_{21}=0.131$ $(R_b+R_a)/(R_b-R_a)=-0.05$, $R_{21}=-550.000$ na=1.49782, $\nu_a=82.52$, nb=1.49782, $\nu_b=82.52$
where the numbers at the left end represent the order from the object side, r represents the radius of curvature of each lens surface, d represents the spacing between adjacent lens surfaces, n represents the refractive index of each lens, $\nu$ represents the Abbe number of each lens, Fno represents F number, $\beta$ represents the photographing magnification, D0 represents the distance from the object to the first lens surface, $f_{21}$ represents the focal length of the first negative lens component in the second lens unit, $f_{22}$ represents the focal length of the second negative lens component in the second lens unit, Ra represents the radius of curvature of the object side surface of the negative first lens component in the second lens unit, Rb represents the radius of curvature of the image side surface of the negative second lens component in the second lens unit, $R_{21}$ represents the radius of curvature of that surface of the second lens unit which is most adjacent to the object side, na represents the refractive index of the positive lens component in the first lens unit, nb represents the refractive index of the positive lens component in the third lens unit which is most adjacent to the object side, $\nu a$ represents the Abbe number of the positive lens component in the rearward unit of the first lens unit, and $\nu b$ represents the Abbe number of the positive lens component in the third lens unit which is most adjacent to the object side.

16. An internal focusing telephoto lens according to claim 13, wherein said third lens unit moves across the optical axis to obtain an image stabilizing effect.

17. An internal focusing telephoto lens comprising in the order from the object side:
   a first lens unit of positive refractive power having at least a positive first lens component;
   a second lens unit having negative refractive power and movable along the optical axis for focusing; and
   a third lens unit composed of only a positive lens component having biconvex form and having an imaging function;
   said first lens unit forming a substantially afocal system with said second lens unit and being designed to satisfy the following conditions:

$$0.43<\phi/f_1<0.75$$

$$0.39<f_1/F<0.55$$

$$0<R_1+0.9R_2$$

where
   $\phi$: the effective diameter of the object side lens surface of the positive first lens component in the first lens unit,
   $f_1$: the focal length of the first lens unit;
   F: the focal length of the entire system,
   $R_1$: the radius of curvature of the object side lens surface of the positive lens component in the third lens unit;
   $R_2$: the radius of curvature of the image side lens surface of the positive lens component in the third lens unit.

18. An internal focusing telephoto lens according to claim 17, wherein said positive lens component of biconvex form in said third lens unit is designed to satisfy the following conditions:

$$nc<1.55$$

$$\nu c>50$$

where
   nc: the refractive index of the biconvex form lens,
   $\nu c$: the Abbe number of the biconvex form lens.

19. An internal focusing telephoto lens according to claim 17, wherein said third lens unit moves across the optical axis to obtain an image stabilizing effect.

20. An internal focusing telephoto lens comprising in the order from the object side:
   a first lens unit of positive refractive power having at least a positive first lens component;
   a second lens unit of negative refractive power and movable along the optical axis for focusing; and
   a third lens unit composed of only a positive lens component having biconvex form and a negative meniscus lens whose concave surface faces the object side and having an imaging function;
   said first lens unit forming a substantially afocal system with said second lens unit and being designed to satisfy the following conditions:

$$0.43 < \phi/f_1 0.75$$

$$0.39 < f_1/F < 0.55$$

$$0 < R_1 + 0.9 R_2$$

where
- $\phi$: the effective diameter of the object side lens surface of the first lens component in the first lens unit;
- $f_1$: the focal length of the first lens unit;
- $F$: the focal length of the entire system;
- $R_1$: the radius of curvature of the object side lens surface of the positive lens component in the third lens unit;
- $R_2$: the radius of curvature of the image side lens surface of the positive lens component in the third lens unit.

21. An internal focusing telephoto lens according to claim 20, wherein said positive lens component of biconvex form in said third lens unit is designed to satisfy the following conditions:

$$nb < 1.58$$

$$\nu b > 45$$

where
- nb: the refractive index of the biconvex form lens,
- $\nu b$: the Abbe number of the biconvex form lens.

22. An internal focusing telephoto lens according to claim 20, wherein said third lens unit moves across the optical axis to obtain an image stabilizing effect.

23. An internal focusing telephoto lens comprising in the order from the object side:
- a first lens unit of positive refractive power having at least a positive first lens component;
- a second lens unit of negative refractive power and movable along the optical axis for focusing; and
- a third lens unit consisting of, in the order from the object side, a positive lens component, a negative meniscus lens whose concave surface faces the object side and a positive lens component whose concave surface faces the object side and having an imaging function;
- said first lens unit forming a substantially afocal system with said second lens unit and being designed to satisfy the following conditions:

$$0.43 < \phi/f_1 < 0.75$$

$$0.39 < f_1/F < 0.55$$

$$0 < R_1 + 0.9 R_2$$

where
- $\phi$: the effective diameter of the object side lens surface of the positive first lens component in the first lens unit,
- $f_1$: the focal length of the first lens unit,
- $F$: the focal length of the entire system,
- $R_1$: the radius of curvature of the object side lens surface of the positive lens component which is most adjacent to the object side in the third lens unit,
- $R_2$: the radius of curvature of the image side lens surface of the positive lens component which is most adjacent to the object side in the third lens unit.

24. An internal focusing telephoto lens according to claim 23, wherein said positive lens component whose concave surface faces the object side in said third lens unit is designed to satisfy the following conditions:

$$nb < 1.58$$

$$\nu b > 45$$

where
- nb: the refractive index of the positive lens component which is most adjacent to the object side in the third lens unit;
- $\nu b$: the Abbe number of the positive lens component which is most adjacent to the object side in the third lens unit.

25. An internal focusing telephoto lens according to claim 23, wherein said third lens unit moves across the optical axis to obtain an image stabilizing effect.

26. An internal focusing telephoto lens comprising in the order from the object side:
- a first lens unit of positive refractive power having at least a positive first lens component;
- a second lens unit at least including a negative first lens component and a negative second lens component, having negative refractive power as a whole and movable along the optical axis for focusing; and
- a third lens unit of positive refractive power and having an imaging function;
- said first lens unit forming a substantially afocal system with said second lens unit and being designed to satisfy the following conditions:

$$0.43 < \phi/f_1 < 0.75$$

$$0.39 < f_1/F < 0.55$$

$$0.13 < f_{22}/f_{21} < 0.35$$

where
- $\phi$: the effective diameter of the objective side lens surface of the positive first lens component in the first lens unit,
- $f_1$: the focal length of the first lens unit;
- $F$: the focal length of the entire system;
- $f_{21}$: the focal length of the negative first lens component in the second lens unit;
- $f_{22}$: the focal length of the negative second lens component in the second lens unit.

27. An internal focusing telephoto lens according to claim 26, wherein when the radius of curvature of the object side surface of said negative first lens component in said second lens unit and the radius of curvature of the image side surface of said negative second lens component in said second lens unit are Ra and Rb, respectively, said negative first lens component is designed to satisfy the following condition:

$$-1.3 < (Rb + Ra)/(Rb - Ra) < 3.0$$

28. An internal focusing telephoto lens according to claim 27, wherein when the radius of curvature of said second lens unit which is most adjacent to the object side is $R_{21}$, said second lens unit is designed to satisfy the following condition:

$$R_{21} < 0.$$

29. An internal focusing telephoto lens according to claim 26, wherein said third lens unit moves across the optical axis to obtain an image stabilizing effect.

30. An internal focusing telephoto lens comprising in the order from the object side:
- a first lens unit of positive refractive power as a whole composed of a front unit of positive refractive power including a positive first lens component, a positive second lens component and a negative third lens component, and a rear unit of positive refractive power which is weaker than that of said front unit at least including a positive meniscus lens whose convex surface faces the object side;
- a second lens unit having negative refractive power and movable along the optical axis for focusing; and
- a third lens unit having positive refractive power and having an imaging function; and
being designed to satisfy the following conditions:

$$0.43 < \phi/f_1 < 0.75$$

$$0.39 < f_1/F < 0.55$$

$$na < 1.60$$

$$va > 65$$

where $\phi$: the effective diameter of the object side lens surface of the positive first lens component in the first lens unit;

$f_1$: the focal length of the first lens unit;

F: the focal length of the entire system;

na: the refractive index of the positive meniscus lens in the rear lens unit;

va: the Abbe number of the positive meniscus lens in the rear lens unit.

31. An internal focusing telephoto lens according to claim 30, wherein said third lens unit moves across the optical axis to obtain an image stabilizing effect.

32. An internal focusing telephoto lens comprising in the order from the object side:
- a first lens unit of positive refractive power having at least a positive first lens component;
- a second lens unit having negative refractive power and movable along the optical axis for focusing; and
- a third lens unit at least including a positive lens component having biconvex form and having an imaging function; and
being designed to satisfy the following conditions:

$$0.43 < \phi/f_1 < 0.75$$

$$0.39 < f_1/F < 0.55$$

$$nb < 1.58$$

$$vb < 45$$

where $\phi$: the effective diameter of the object side lens surface of the positive first lens component in the first lens unit;

$f_1$: the focal length of the first lens unit;

F: the focal length of the entire system;

nb: the refractive index of the positive lens component which is most adjacent to the object side in the third lens unit;

vb: the Abbe number of the positive lens component which is most adjacent to the object side in the third lens unit.

33. An internal focusing telephoto lens according to claim 32, wherein said third lens unit moves across the optical axis to obtain an image stabilizing effect.

34. An internal focusing telephoto lens comprising in the order from the object side:
- a first lens unit of positive refractive power having at least a positive first lens component;
- a second lens unit at least including a negative first lens component and a negative second lens component, having negative refractive power as a whole and movable along the optical axis for focusing; and
- a third lens unit of positive refractive power and having an imaging function; and
being designed to satisfy the following conditions:

$$0.43 < \phi/f_1 < 0.75$$

$$0.39 < f_1 F < 0.55$$

$$0.13 < f_{22}/f_{21} < 0.35$$

where $\phi$: the effective diameter of the object side lens surface of the positive first lens component in the first lens unit;

$f_1$: the focal length of the first lens unit;

F: the focal length of the entire system;

$f_{21}$: the focal length of the negative first lens component in the second lens unit;

$f_{22}$: the focal length of the negative second lens component in the second lens unit.

35. An internal focusing telephoto lens according to claim 34, wherein said third lens unit moves across the optical axis to obtain an image stabilizing effect.

* * * * *